US008229817B2

(12) United States Patent
Shepherd

(10) Patent No.: US 8,229,817 B2
(45) Date of Patent: *Jul. 24, 2012

(54) METHODS AND APPARATUS RELATING TO THE FORMULATION AND TRADING OF INVESTMENT CONTRACTS

(75) Inventor: Ian Kenneth Shepherd, Toorak (AU)

(73) Assignee: Alice Corporation Pty Ltd. (AU)

(*) Notice: Subject to any disclaimer, the term of this patent is extended or adjusted under 35 U.S.C. 154(b) by 0 days.

This patent is subject to a terminal disclaimer.

(21) Appl. No.: 12/607,786

(22) Filed: Oct. 28, 2009

(65) Prior Publication Data

US 2010/0049649 A1 Feb. 25, 2010

Related U.S. Application Data

(63) Continuation of application No. 10/615,796, filed on Jul. 10, 2003, now Pat. No. 7,617,147, which is a continuation of application No. 09/667,423, filed on Sep. 21, 2000, now Pat. No. 6,622,130, which is a continuation of application No. 09/000,264, filed as application No. PCT/AU96/00420 on Jul. 5, 1996, now Pat. No. 6,157,918.

(30) Foreign Application Priority Data

Jul. 7, 1995 (AU) .................................. PN 4060
May 2, 1996 (AU) .................................. PN 9636

(51) Int. Cl.
*G06Q 40/00* (2012.01)
(52) U.S. Cl. ........................ 705/35; 705/37; 705/36 R
(58) Field of Classification Search ................. 705/35
See application file for complete search history.

(56) References Cited

U.S. PATENT DOCUMENTS 3,573,747 A 4/1971 Adams et al.
4,346,442 A 8/1982 Musmanno
(Continued)

FOREIGN PATENT DOCUMENTS

EP 0 407 026 A2 1/1991
(Continued)

OTHER PUBLICATIONS

"Heavy Losses Have Been Chalked Up by City Punters Betting on the Financial Markets," *Evening Standard*, Oct. 22, 1987, p. 39.

(Continued)

*Primary Examiner* — James P Trammell
*Assistant Examiner* — Daniel L Greene
(74) *Attorney, Agent, or Firm* — Sterne, Kessler, Goldstein & Fox PLLC

(57) ABSTRACT

A system to enable the formulation of multi-party investments contracts. The system allows an ordering party to input contract data relating to at least one phenomenon that has a range of future outcomes and a future time of maturity. The contract data further includes a set of probabilities of occurrence for each outcome in the range and a consideration due to a counterparty at or after the time of maturity. One or more counterparties can input registering data including a set of probabilities of occurrence for each outcome in the range. The system prices and matches a contract by applying at least one template of entitlement as a function of outcome to each counterparty's set of probabilities to give one or more individual counterparty prices each equal to the ordering party's consideration, and further, applying the ordering party's set of probabilities to each template to derive an implied entitlement.

8 Claims, 49 Drawing Sheets

U.S. PATENT DOCUMENTS

| | | | |
|---|---|---|---|
| 4,376,978 | A | 3/1983 | Musmanno |
| 4,674,044 | A | 6/1987 | Kalmus |
| 4,722,055 | A | 1/1988 | Roberts |
| 4,739,478 | A | 4/1988 | Roberts et al. |
| 4,751,640 | A | 6/1988 | Lucas et al. |
| 4,766,539 | A | 8/1988 | Fox |
| 4,823,264 | A | 4/1989 | Deming |
| 4,831,526 | A | 5/1989 | Luchs et al. |
| 4,839,804 | A | 6/1989 | Roberts et al. |
| 4,903,201 | A | 2/1990 | Wagner |
| 4,933,842 | A | 6/1990 | Durbin et al. |
| 4,953,085 | A | 8/1990 | Atkins |
| 4,975,840 | A | 12/1990 | DeTore et al. |
| 4,980,826 | A | 12/1990 | Wagner |
| 5,077,665 | A | 12/1991 | Silverman et al. |
| 5,101,353 | A | 3/1992 | Lupien et al. |
| 5,126,936 | A | 6/1992 | Champion et al. |
| 5,136,501 | A | 8/1992 | Silverman et al. |
| 5,970,479 | A | 10/1999 | Shepherd |
| 6,134,536 | A | 10/2000 | Shepherd |
| 6,157,918 | A | 12/2000 | Shepherd |
| 6,622,130 | B1 | 9/2003 | Shepherd |
| 7,617,147 | B2 * | 11/2009 | Shepherd ................. 705/37 |

FOREIGN PATENT DOCUMENTS

| | | |
|---|---|---|
| EP | 0 434 224 A2 | 6/1991 |
| EP | 0 448 800 A1 | 10/1991 |
| EP | 0 512 702 A2 | 11/1992 |
| GB | 1 489 573 | 10/1977 |
| GB | 2 180 380 A | 3/1987 |
| WO | WO 90/11571 | 10/1990 |
| WO | WO 91/14231 | 9/1991 |
| WO | WO 93/15467 | 8/1993 |
| WO | WO 94/20912 | 9/1994 |
| WO | WO 94/28496 | 12/1994 |
| WO | WO 96/18160 | 6/1996 |

OTHER PUBLICATIONS

"A Number of City Brokers and Dealers are Facing Financial Ruin as a Result of Losses They Have Incurred by Gambling on Future Movements in Stock Market Indices," *Evening Standard*, Oct. 30, 1987, p. 59.

"Christopher Hales, the Managing Director of City Index, the Organisation that Allows Punters to Bet on the FTSE Index, Has Not Yet Been Offered a Porsche . . . " *Evening Standard*, Nov. 2, 1987, p. 50.

"The Game of Professional Investment is Intolerably Boring and Over-Exacting to Anyone Who is Entirely Exempt from the Gambling Instinct, While He Who Has it Must Pay to this Propensity the Appropriate Toll," *Planned Savings*, Dec. 1987, pp. 50-51.

"UK: Law Prohibiting Stock Market Betting Agencies from Suing Clients Overturned in Recent Legislation," *The Times*, Jul. 24, 1990.

"UK: Court Rules Gamblers Owing Money on Bets on Stock Market Have to Pay Up," *Mail on Sunday*, Jul. 29, 1990, p. 61.

"UK: Independent Law Report—Stock Market Movement Bet Claimed," *Independent* Aug. 3, 1990, p. 13.

"UK: City Index Successfully Sues Spencer Leslie for £35,000," *Euroweek* Aug. 3, 1990, p. 23.

"UK: Times Law Report—Differences Contract is Enforceable," *The Times*, Oct. 3, 1990.

"UK: Current Law—*City Index Ltd*. v. *Leslie*; Gaming Contracts are Unenforceable Unlike Business Contracts," *Chartered Surveyor Law Report*, Oct. 18, 1990, p. 132.

"UK: Court of Appeal Rejects Market Gambler Case," *Financial Times*, The Financial Time Limited, Mar. 15, 1991, p. 7.

"UK: Personal Finance (Savings Snips)—City Saver—City Index Link," *Observer*, Mar. 7, 1993, p. 35.

"UK: Spread Your Bets for Dodgy Deregulation," *Evening Standard*, Apr. 7, 1995.

"UK: How to Make a Winning Spread Bet This Summer—The New Gambling—Cover Story," *The Times*, Apr. 8, 1995.

"UK: Family Finance—Do You Fancy a Financial Flutter?" *Sunday Telegraph*, The Sunday Telegraph Limited, London, Apr. 9, 1995, p. 9.

Nigel Cope, "UK: Where Bookie Meets Broker," *Management Today*, May 1995, p. 76.

Jonathan Davis, "UK: Your Money—Spread Betting—Risk and Reward in Selling the Ivory Coast Short," *Independent*, May 27, 1995, p. 21.

"UK: Register—Meal Quarterly Summary—Jun. 1995—City Index Ltd.," *Register—Meal*, Jun. 14, 1995.

"UK: Scrum on Down for New Way of Betting," *Mail on Sunday*, Jun. 18, 1995.

Lucy Roberts, "UK: City Diary—City Index Weather Forecasts," *Independent*, Jun. 23, 1995, p. 26.

"UK: Christmas Day Snow Index Launched," *Evening Standard*, Dec. 8, 1995.

Joe Saumarez Smith, "Australia: City—Bookie's Move to Hit Betting Duty," *Sunday Telegraph*, The Sunday Telegraph Limited, London, Dec. 24, 1995, p. 2.

"UK: City Diary—Spreading the Word," *Daily Telegraph*, The Telegraph plc, London, Mar. 21, 1996, p. 21.

"UK: City Diary—Index Link a Fairly Safe Bet," *Daily Telegraph*, The Telegraph plc, London, Jul. 16, 1996, p. 25.

"UK: IG Index Comments on Rivals Merger Plans," *Evening Standard*, Jul. 17, 1996.

"UK: City Index—Partners," *Financial Times*, Financial Times Limited, Oct. 14, 1996, p. 14.

"UK: Reuters Launches Two UK Stock Indices," *Reuters Limited*, Nov. 8, 1996.

Paul Stokes, "UK: New Index Sparks a Worldwide Market for Scotland," *Scotsman*, Nov. 9, 1996, p. 21.

"UK: City Diary—Bookmaker Chief Appointed," *Daily Telegraph*, Telegraph Group Limited, London, Mar. 24, 1997, p. 26.

"UK: Family Finance—Bond Pep From Age Concern—Savings Scene," *Sunday Telegraph*, Telegraph Group Limited, London, Sep. 14, 1997, p. 10.

Raymond Snoddy, "UK: Mirror to Launch Online Betting Service with PA—The Mirror Group—PA News," *The Times*, Times Newspaper Ltd, Sep. 19, 1997, p. 25.

"The DTB—West Germany's New Options and Futures Exchange. (2 of 2)," *Business Briefing* published in *Institutional Investor*, Aug. 31, 1989.

Richard Murphy, "Soffex Well-Established After First Six Months," *Business Briefing* published by Reuters News Service, Zurich, Nov. 16, 1988.

"A New Futures and Options Exchange to Come into Effect in 1990. (2 of 3)," *Business Briefing* published in *Euromoney Supplements*, Nov. 17, 1989.

"A New Futures and Options Exchange to Come into Effect in 1990. (3 of 3)," *Business Briefing* published in *Euromoney Supplements*, Nov. 17, 1989, p. 14.

"The Success of Soffex—The World's First Fully Automated Exchange," *Business Briefing*, Nov. 17, 1989.

Curtis M. Elliott and Emmett J. Vaughan: "Fundamentals of Risk and Insurance," *John Wiley & Sons*, Inc., 1972.

William A. Spurr and Charles P. Bonini: "Statistical Analysis for Business Decisions," Richard D. Irwin, Inc., 1974.

John W. Labuszewski and John E. Nyhoff: "Trading Options on Futures—Markets, Methods, Strategies and Tactics," John Wiley & Sons, Inc., 1988.

Edgar E. Peters: "Chaos and Order in the Capital Markets—A New View of Cycles, Prices, and Market Volatility," John Wiley & Sons, Inc., 1991.

David Mayers and Clifford Smith: "The Corporate Insurance Decision"—journal article reprinted in "The Revolution in Corporate Finance" edited by Joel M. Stern & Donald H. Chew, Jr., Blackwell Finance, 1992.

Charles Smithson and Clifford Smith: "Managing Financial Risk"—journal article reprinted in "The Revolution in Corporate Finance" edited by Joel M. Stern & Donald H. Chew, Jr., Blackwell Finance, 1992.

Donald R. Lessard: "Finance and Global Competition: Exploiting Financial Scope and Coping with Volatile Exchange Rates"—journal article reprinted in "The Revolution in Corporate Finance" edited by Joel M. Stern & Donald H. Chew, Jr., Blackwell Finance, 1992.

Alan C. Shapiro and Sheridan Titman: "An Integrated Approach to Corporate Risk Management"—journal article reprinted in "The Revolution in Corporate Finance" edited by Joel M. Stern & Donald H. Chew, Jr., Blackwell Finance, 1992.

* cited by examiner

FIG. 6

| | |
|---|---|
| APPLICATION SPECIFICATION | AS AT 91.06.03.17.00.00.00 |
| APPLICATION ID: | 001 |
| APPLICATION PROMOTER: | BLC INC |
| | |
| PRIMARY APPLICATION USE: | INVESTMENT MANAGEMENT |
| FEASIBLE COUNTERPARTY NUMBERS: | MULTIPLE COUNTERPARTIES |
| PUBLIC/PRIVATE USE: | PUBLIC USE |
| ACCEPTABLE COMMS MEDIUMS: | COMPUTER - COMPUTER LINK |
| RETAIL/WHOLESALE USE: | WHOLESALE USE |
| PRICING AND MATCHING PROCESS: | MAXIMIZE PRE-TAX EXPECTED RETURN ON CONSIDERATION INVESTMENT |
| CONTRACT REVALUATION FREQUENCY: | DAILY |
| ORDERING PARTIES ALLOWED NEGATIVE CONTRACT PAYOFFS? | YES |
| APPLICATION ACCESS LIMITATIONS: | NONE |

FIG. 7

| | |
|---|---|
| PRODUCT SPECIFICATION | AS AT 91.06.03.17.00.00.00 |
| PRODUCT ID: | 10061 |
| PRODUCT SUMMARY: | |
| APPLICATION ID: | 001 |
| APPLICATION PROMOTER: | BLC INC |
| PRODUCT SPECIFICATIONS: | |
| MARKET: | STOCK INDICES |
| SUB-MARKET: | PTSE 75 |
| MARKET TYPE: | SPOT |
| ESTABLISHMENT DATE/TIME: | 91.06.03.17.00.00.00 |
| MATURITY DATE/TIME: | 96.06.03.17.00.00.00 |
| CONSIDERATION/ENTITLEMENT DENOMINATION TYPE: | MONEY |
| CURRENCY TYPE(IF APPLICABLE): | COMMERCIAL BANK DEPOSIT |
| NATIONAL CURRENCY TYPE(IF APPLICABLE): | AUD |
| MINIMUM PRODUCT DEFINITION VALUE: | 1600 |
| MAXIMUM PRODUCT DEFINITION VALUE: | 2200 |
| PRODUCT STEP VALUE: | 10 |

FIG. 9A

| | | | |
|---|---|---|---|
| ORDER SPECIFICATION PRICING | | AS AT 95.01.01.17.38.02.00 | |
| ORDER SPECIFICATION PRICING PARTY: | ABRAHAMSONS [Potential Counterparty No 1] | | |
| DEFINED CIRCUMSTANCES ID: 26 | COMMISSION RATE: 1.25%<br>DISCOUNT RATE: 10.00% pa<br>COMPONENT PRODUCT PRICES: see Column 3 below | | |

| Feasible<br>Product<br>Definition<br>Values | Net<br>Contingent<br>Entitlement<br>Amounts | Component<br>Product<br>Prices<br>[ID 26] | Implied<br>Contingent<br>Entitlement<br>Amounts |
|---|---|---|---|
| < | 0.00 | | |
| 1600 | (187.200) | 0.000220 | (0.041) |
| 1610 | (187.200) | 0.000227 | (0.042) |
| 1620 | (187.200) | 0.000237 | (0.044) |
| 1630 | (187.200) | 0.000249 | (0.047) |
| 1640 | (187.200) | 0.000266 | (0.050) |
| 1650 | (187.200) | 0.000287 | (0.054) |
| 1660 | (187.200) | 0.000314 | (0.059) |
| .... | .... | .... | .... |
| .... | .... | .... | .... |
| 2130 | (37.440) | 0.029642 | (1.110) |
| 2140 | (37.440) | 0.028625 | (1.072) |
| 2150 | (37.440) | 0.027469 | (1.028) |
| 2160 | (37.440) | 0.026193 | (0.981) |
| 2170 | (37.440) | 0.024819 | (0.929) |
| 2180 | (37.440) | 0.023369 | (0.875) |
| 2190 | (37.440) | 0.021865 | (0.819) |
| 2200 | (37.440) | 0.020330 | (0.761) |
| > | (0.000) | 0.146635 | 0.000 |
| | | 1.0402 | (59.580) |

Base Contract Bid Price(in Product Denomination terms): 59.580
Net Present Value (at 10.00% pa): 51.280
+ Flat Commission (1.25%) 0.640
= Contract Bid Price (in Product Denomination Terms): 51.920
Implied Base Margin on Contract:

FIG. 9B

Application ID: 001
ProductID: 10061

| Assessed Probabilities of Occurrence | Net Contingent Entitlement (Valuation) Amounts | Net Contingent Negative Entitlement (Valuation) Amounts | Maximum Absolute Negative Entitlement Amount |
|---|---|---|---|
| 0.000020 | (0.004) | (0.004) | (187.200) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.000) | (55.000) | (187.200) |

```
ORDER SPECIFICATION PRICING                         AS AT 95.01.01.17.38.02.00

ORDER SPECIFICATION PRICING PARTY:   ABRAHAMSONS [Potential Counterparty No 1]

DEFINED CIRCUMSTANCES ID:  26        COMMISSION RATE:  1.25%
                                     DISCOUNT RATE: 10.00% pa
                                     COMPONENT PRODUCT PRICES: see Column 3 below
```

| Feasible Product Definition Values | Net Contingent Entitlement Amounts | Component Product Prices [ID 26] | Implied Contingent Entitlement Amounts |
|---|---|---|---|
| < | 0.00 | | |
| 1600 | (188.200) | 0.000220 | (0.041) |
| 1610 | (188.200) | 0.000227 | (0.042) |
| 1620 | (188.200) | 0.000237 | (0.044) |
| 1630 | (188.200) | 0.000249 | (0.047) |
| 1640 | (188.200) | 0.000266 | (0.050) |
| 1650 | (188.200) | 0.000287 | (0.054) |
| 1660 | (188.200) | 0.000314 | (0.059) |
| .... | .... | .... | .... |
| .... | .... | .... | .... |
| 2130 | (37.440) | 0.029642 | (1.110) |
| 2140 | (37.440) | 0.028625 | (1.072) |
| 2150 | (37.440) | 0.027469 | (1.028) |
| 2160 | (37.440) | 0.026193 | (0.981) |
| 2170 | (37.440) | 0.024819 | (0.929) |
| 2180 | (37.440) | 0.023369 | (0.875) |
| 2190 | (37.440) | 0.021865 | (0.819) |
| 2200 | (37.440) | 0.020330 | (0.761) |
| > | 0.000 | 0.146635 | 0.000 |
| | | 1.0402 | (59.580) |

```
Base Contract Bid Price(in Product Denomination terms):    59.580
Net Present Value (at 10.00% pa):                          51.280
+ Flat Commission (1.25%)                                   0.640
= Contract Bid Price (in Product Denomination Terms):      51.920
Implied Base Margin on Contract:
```

FIG. 10B

Application ID: 001
ProductID: 10061

| Assessed Probabilities of Occurrence | Net Contingent Entitlement (Valuation) Amounts | Net Contingent Negative Entitlement (Valuation) Amounts | Maximum Absolute Negative Entitlement Amount |
|---|---|---|---|
| 0.000020 | (0.004) | (0.004) | (188.200) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.000) | (55.000) | (188.200) |

```
ORDER SPECIFICATION PRICING                             AS AT 95.01.01.17.38.02.00

ORDER SPECIFICATION PRICING PARTY:    ABRAHAMSONS [Potential Counterparty No 1]

DEFINED CIRCUMSTANCES ID:  26         COMMISSION RATE:  1.25%
                                      DISCOUNT RATE: 10.00% pa
                                      COMPONENT PRODUCT PRICES: see Column 3 below
```

| Feasible Product Definition Values | Net Contingent Entitlement Amounts | Component Product Prices (ID 26) | Implied Contingent Entitlement Amounts |
|---|---|---|---|
| < | 0.00 | | |
| 1600 | (187.200) | 0.000220 | (0.041) |
| 1610 | (187.200) | 0.000227 | (0.042) |
| 1620 | (187.200) | 0.000237 | (0.044) |
| 1630 | (187.200) | 0.000249 | (0.047) |
| 1640 | (187.200) | 0.000266 | (0.050) |
| 1650 | (187.200) | 0.000287 | (0.054) |
| 1660 | (187.200) | 0.000314 | (0.059) |
| .... | .... | .... | .... |
| .... | .... | .... | .... |
| 2130 | (37.440) | 0.029642 | (1.110) |
| 2140 | (37.440) | 0.028625 | (1.072) |
| 2150 | (37.440) | 0.027469 | (1.028) |
| 2160 | (37.440) | 0.026193 | (0.981) |
| 2170 | (37.440) | 0.024819 | (0.929) |
| 2180 | (37.440) | 0.023369 | (0.875) |
| 2190 | (37.440) | 0.021865 | (0.819) |
| 2200 | (37.440) | 0.020330 | (0.761) |
| > | 0.000 | 0.146635 | 0.000 |
| | | 1.0402 | (59.580) |

```
Base Contract Bid Price(in Product Denomination terms):       59.580
Net Present Value (at 10.00% pa):                             51.280
+ Flat Commission (1.25%)                                      0.640
= Contract Bid Price (in Product Denomination Terms):         51.920
Implied Base Margin on Contract:
```

FIG. 11B

Application ID: 001
ProductID: 10061

| Assessed Probabilities of Occurrence | Net Contingent Entitlement (Valuation) Amounts | Net Contingent Negative Entitlement (Valuation) Amounts | Maximum Absolute Negative Entitlement Amount |
|---|---|---|---|
| 0.000020 | (0.004) | (0.004) | (187.200) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.000) | (55.000) | (187.200) |

```
ORDER SPECIFICATION PRICING                    AS AT 95.01.01.17.38.02.00

ORDER SPECIFICATION PRICING PARTY:   ABRAHAMSONS [Potential Counterparty No 1]

DEFINED CIRCUMSTANCES ID:  26        COMMISSION RATE:  1.25%
                                     DISCOUNT RATE:   10.00% pa
                                     COMPONENT PRODUCT PRICES: see Column 3 below
```

| Feasible Product Definition Values | Net Contingent Entitlement Amounts | Component Product Prices [ID 26] | Implied Contingent Entitlement Amounts |
|---|---|---|---|
| <    | 0.00      |          |         |
| 1600 | (188.200) | 0.000220 | (0.041) |
| 1610 | (188.200) | 0.000227 | (0.042) |
| 1620 | (188.200) | 0.000237 | (0.044) |
| 1630 | (188.200) | 0.000249 | (0.047) |
| 1640 | (188.200) | 0.000266 | (0.050) |
| 1650 | (188.200) | 0.000287 | (0.054) |
| 1660 | (188.200) | 0.000314 | (0.059) |
| .... | ....      | ....     | ....    |
| .... | ....      | ....     | ....    |
| 2130 | (37.440)  | 0.029642 | (1.110) |
| 2140 | (37.440)  | 0.028625 | (1.072) |
| 2150 | (37.440)  | 0.027469 | (1.028) |
| 2160 | (37.440)  | 0.026193 | (0.981) |
| 2170 | (37.440)  | 0.024819 | (0.929) |
| 2180 | (37.440)  | 0.023369 | (0.875) |
| 2190 | (37.440)  | 0.021865 | (0.819) |
| 2200 | (37.440)  | 0.020330 | (0.761) |
| >    | 0.000     | 0.146635 | 0.000   |
|      |           | 1.0402   | (59.580)|

```
Base Contract Bid Price (in Product Denomination terms):   59.580
Net Present Value (at 10.00% pa):                          51.280
+ Flat Commission (1.25%)                                   0.640
= Contract Bid Price (in Product Denomination Terms):      51.920
Implied Base Margin on Contract:
```

FIG. 12B

Application ID: 001
ProductID: 10061

| Assessed Probabilities of Occurrence | Net Contingent Entitlement (Valuation) Amounts | Net Contingent Negative Entitlement (Valuation) Amounts | Maximum Absolute Negative Entitlement Amount |
|---|---|---|---|
| 0.000020 | (0.004) | (0.004) | (188.200) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.000) | (55.000) | (188.200) |

47.340

4.580

FIG. 13A
```
ORDER SPECIFICATION PRICING                 AS AT 95.01.01.17.38.02.00
ORDER SPECIFICATION PRICING PARTY:   ABRAHAMSONS [Potential Counterparty No 1]
DEFINED CIRCUMSTANCES ID:  26        COMMISSION RATE:  1.25%
                                     DISCOUNT RATE: 10.00% pa
FEASIBLE SETS OF CONTINGENT ENTITLEMENT PAYOUTS TO ABBOTTS & TAYLOR
```
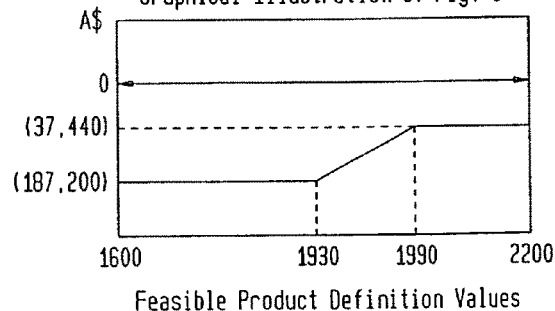
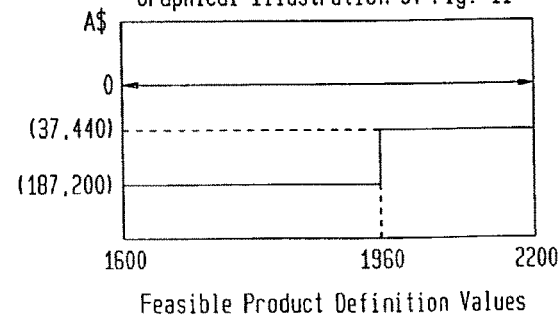

FIG. 14A

```
ORDER SPECIFICATION PRICING                    AS AT 95.01.01.17.38.02.00

ORDER SPECIFICATION PRICING PARTY:   CARPENTERS [Potential Counterparty No 2]

DEFINED CIRCUMSTANCES ID:  17        COMMISSION RATE: 1.30%
                                     DISCOUNT RATE: 9.8% pa
                                     COMPONENT PRODUCT PRICES: see Column 3 below
```

| Feasible Product Definition Values | Net Contingent Entitlement Amounts | Component Product Prices [ID 17] | Implied Contingent Entitlement Amounts |
|---|---|---|---|
| <    | 0.00      |          |          |
| 1600 | (185.000) | 0.000220 | (0.041)  |
| 1610 | (185.000) | 0.000226 | (0.042)  |
| 1620 | (185.000) | 0.000237 | (0.044)  |
| 1630 | (185.000) | 0.000249 | (0.046)  |
| 1640 | (185.000) | 0.000265 | (0.049)  |
| 1650 | (185.000) | 0.000287 | (0.053)  |
| 1660 | (185.000) | 0.000314 | (0.058)  |
| .... | ....      | ....     | ....     |
| .... | ....      | ....     | ....     |
| 2130 | (37.440)  | 0.029641 | (1.110)  |
| 2140 | (37.440)  | 0.028625 | (1.072)  |
| 2150 | (37.440)  | 0.027469 | (1.028)  |
| 2160 | (37.440)  | 0.026192 | (0.981)  |
| 2170 | (37.440)  | 0.024819 | (0.929)  |
| 2180 | (37.440)  | 0.023369 | (0.875)  |
| 2190 | (37.440)  | 0.021864 | (0.819)  |
| 2200 | (37.440)  | 0.020330 | (0.761)  |
| >    | 0.000     | 0.146635 | 0.000    |
|      |           | 1.0300   | (59.600) |

```
Base Contract Bid Price(in Product Denomination terms):   59.600
Net Present Value (at 9.8% pa):                           51.310
+ Flat Commission (1.30%)                                  0.610
= Contract Bid Price (in Product Denomination Terms):     51.920
Implied Base Margin on Contract:
```

FIG. 14B

Application ID: 001
ProductID: 10061

| Assessed Probabilities of Occurrence | Net Contingent Entitlement (Valuation) Amounts | Net Contingent Negative Entitlement (Valuation) Amounts | Maximum Absolute Negative Entitlement Amount |
|---|---|---|---|
| 0.000020 | (0.004) | (0.004) | (185.000) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.120) | (55.120) | (185.000) |

```
ORDER SPECIFICATION PRICING                        AS AT 95.01.01.17.38.02.00

ORDER SPECIFICATION PRICING PARTY:    CARPENTERS [Potential Counterparty No 2]

DEFINED CIRCUMSTANCES ID:  17        COMMISSION RATE:  1.30%
                                     DISCOUNT RATE: 9.8% pa
                                     COMPONENT PRODUCT PRICES: see Column 3 below
```

| Feasible Product Definition Values | Net Contingent Entitlement Amounts | Component Product Prices [ID 17] | Implied Contingent Entitlement Amounts |
|---|---|---|---|
| <    | 0.00      |          |          |
| 1600 | (186.000) | 0.000220 | (0.041)  |
| 1610 | (186.000) | 0.000226 | (0.042)  |
| 1620 | (186.000) | 0.000237 | (0.044)  |
| 1630 | (186.000) | 0.000249 | (0.046)  |
| 1640 | (186.000) | 0.000265 | (0.049)  |
| 1650 | (186.000) | 0.000287 | (0.053)  |
| 1660 | (186.000) | 0.000314 | (0.058)  |
| .... | ....      | ....     | ....     |
| .... | ....      | ....     | ....     |
| 2130 | (37.440)  | 0.029641 | (1.110)  |
| 2140 | (37.440)  | 0.028625 | (1.072)  |
| 2150 | (37.440)  | 0.027469 | (1.028)  |
| 2160 | (37.440)  | 0.026192 | (0.981)  |
| 2170 | (37.440)  | 0.024819 | (0.929)  |
| 2180 | (37.440)  | 0.023369 | (0.875)  |
| 2190 | (37.440)  | 0.021864 | (0.819)  |
| 2200 | (37.440)  | 0.020330 | (0.761)  |
| >    | 0.000     | 0.146635 | 0.000    |
|      |           | 1.0300   | (59.600) |

```
Base Contract Bid Price(in Product Denomination terms):       59.600
Net Present Value (at 9.8% pa):                               51.310
+ Flat Commission (1.30%)                                      0.610
= Contract Bid Price (in Product Denomination Terms):         51.920
Implied Base Margin on Contract:
```

FIG. 15B

Application ID: 001
ProductID: 10061

| Assessed Probabilities of Occurrence | Net Contingent Entitlement (Valuation) Amounts | Net Contingent Negative Entitlement (Valuation) Amounts | Maximum Absolute Negative Entitlement Amount |
|---|---|---|---|
| 0.000020 | (0.004) | (0.004) | (186.000) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.120) | (55.120) | (186.000) |

```
ORDER SPECIFICATION PRICING                            AS AT 95.01.01.17.38.02.00

ORDER SPECIFICATION PRICING PARTY:  CARPENTERS [Potential Counterparty No 2]

DEFINED CIRCUMSTANCES ID:  17       COMMISSION RATE:  1.30%
                                    DISCOUNT RATE: 9.8% pa
                                    COMPONENT PRODUCT PRICES: see Column 3 below
```

| Feasible Product Definition Values | Net Contingent Entitlement Amounts | Component Product Prices [ID 17] | Implied Contingent Entitlement Amounts |
|---|---|---|---|
| < | 0.00 | | |
| 1600 | (185.000) | 0.000220 | (0.041) |
| 1610 | (185.000) | 0.000226 | (0.042) |
| 1620 | (185.000) | 0.000237 | (0.044) |
| 1630 | (185.000) | 0.000249 | (0.046) |
| 1640 | (185.000) | 0.000265 | (0.049) |
| 1650 | (185.000) | 0.000287 | (0.053) |
| 1660 | (185.000) | 0.000314 | (0.058) |
| .... | .... | .... | .... |
| .... | .... | .... | .... |
| 2130 | (37.440) | 0.029641 | (1.110) |
| 2140 | (37.440) | 0.028625 | (1.072) |
| 2150 | (37.440) | 0.027469 | (1.028) |
| 2160 | (37.440) | 0.026192 | (0.981) |
| 2170 | (37.440) | 0.024819 | (0.929) |
| 2180 | (37.440) | 0.023369 | (0.875) |
| 2190 | (37.440) | 0.021864 | (0.819) |
| 2200 | (37.440) | 0.020330 | (0.761) |
| > | 0.000 | 0.146635 | 0.000 |
| | | 1.0300 | (59.600) |

```
Base Contract Bid Price(in Product Denomination terms):   59.600
Net Present Value (at 9.8% pa):                           51.310
+ Flat Commission (1.30%)                                  0.610
= Contract Bid Price (in Product Denomination Terms):     51.920
Implied Base Margin on Contract:
```

FIG. 16B

Application ID: 001
ProductID: 10061

| Assessed Probabilities of Occurrence | Net Contingent Entitlement (Valuation) Amounts | Net Contingent Negative Entitlement (Valuation) Amounts | Maximum Absolute Negative Entitlement Amount |
|---|---|---|---|
| 0.000020 | (0.004) | (0.004) | (185.000) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.120) | (55.120) | (185.000) |

```
ORDER SPECIFICATION PRICING                      AS AT 95.01.01.17.38.02.00

ORDER SPECIFICATION PRICING PARTY:   CARPENTERS [Potential Counterparty No 2]

DEFINED CIRCUMSTANCES ID:   17       COMMISSION RATE:  1.30%
                                     DISCOUNT RATE: 9.8% pa
                                     COMPONENT PRODUCT PRICES: see Column 3 below
```

| Feasible Product Definition Values | Net Contingent Entitlement Amounts | Component Product Prices [ID 17] | Implied Contingent Entitlement Amounts |
|---|---|---|---|
| < | 0.00 | | |
| 1600 | (186.000) | 0.000220 | (0.041) |
| 1610 | (186.000) | 0.000226 | (0.042) |
| 1620 | (186.000) | 0.000237 | (0.044) |
| 1630 | (186.000) | 0.000249 | (0.046) |
| 1640 | (186.000) | 0.000265 | (0.049) |
| 1650 | (186.000) | 0.000287 | (0.053) |
| 1660 | (186.000) | 0.000314 | (0.058) |
| .... | .... | .... | .... |
| .... | .... | .... | .... |
| 2130 | (37.440) | 0.029641 | (1.110) |
| 2140 | (37.440) | 0.028625 | (1.072) |
| 2150 | (37.440) | 0.027469 | (1.028) |
| 2160 | (37.440) | 0.026192 | (0.981) |
| 2170 | (37.440) | 0.024819 | (0.929) |
| 2180 | (37.440) | 0.023369 | (0.875) |
| 2190 | (37.440) | 0.021864 | (0.819) |
| 2200 | (37.440) | 0.020330 | (0.761) |
| > | 0.000 | 0.146635 | 0.000 |
|  |  | 1.0300 | (59.600) |

```
Base Contract Bid Price (in Product Denomination terms):    59.600
Net Present Value (at 9.8% pa):                             51.310
+ Flat Commission (1.30%)                                    0.610
= Contract Bid Price (in Product Denomination Terms):       51.920
Implied Base Margin on Contract:
```

FIG. 17B

```
                                                    Application ID: 001
                                                    ProductID: 10061
```

|  | Net | Net | |
|  | Contingent | Contingent | Maximum |
| Assessed | Entitlement | Negative | Absolute |
| Probabilities | (Valuation) | Entitlement | Negative |
| of | Amounts | (Valuation) | Entitlement |
| Occurrence |  | Amounts | Amount |
|---|---|---|---|
| 0.000020 | (0.004) | (0.004) | (186.000) |
| 0.000027 | (0.005) | (0.005) | |
| 0.000037 | (0.007) | (0.007) | |
| 0.000049 | (0.009) | (0.009) | |
| 0.000066 | (0.012) | (0.012) | |
| 0.000087 | (0.016) | (0.016) | |
| 0.000114 | (0.021) | (0.021) | |
| .... | .... | .... | |
| .... | .... | .... | |
| 0.029442 | (1.102) | (1.102) | |
| 0.028425 | (1.064) | (1.064) | |
| 0.027269 | (1.021) | (1.021) | |
| 0.025993 | (0.973) | (0.973) | |
| 0.024619 | (0.922) | (0.922) | |
| 0.023169 | (0.867) | (0.867) | |
| 0.021665 | (0.811) | (0.811) | |
| 0.020130 | (0.754) | (0.754) | |
| 0.158835 | 0.000 | 0.000 | |
| 1.0000 | (55.120) | (55.120) | (186.000) |

```
ORDER SPECIFICATION PRICING                    AS AT 95.01.01.17.38.02.00

ORDER SPECIFICATION PRICING PARTY:   CARPENTERS [Potential Counterparty No 2]

DEFINED CIRCUMSTANCES ID:   17      COMMISSION RATE:  1.30%
                                    DISCOUNT RATE: 9.8% pa

FEASIBLE SETS OF CONTINGENT ENTITLEMENT PAYOUTS TO ABBOTTS & TAYLOR
```

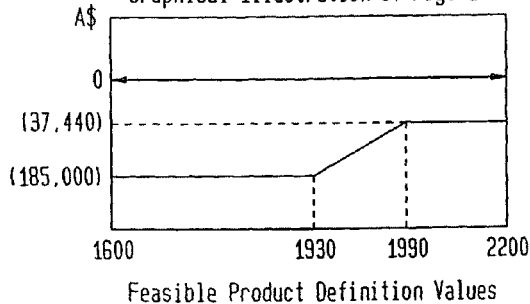

Graphical Illustration of Fig. 14
Feasible Product Definition Values

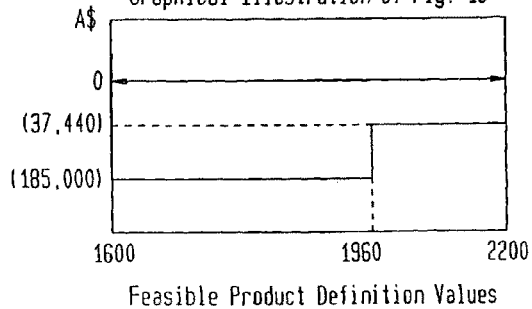

Graphical Illustration of Fig. 16
Feasible Product Definition Values

FIG. 19A

| Feasible Product Values | Ordering Party Assessed Probabilities of Occurrence | Counterparty Contingent Entitlement Payout (A$) Abrahamsons' Offers | | | |
|---|---|---|---|---|---|
| | | No 1 | No 2 | No 3 | No 4 |
| < 1600 | 0.000020 | 187,200 | 188,200 | 187,200 | 188,200 |
| .... | .... | .... | .... | .... | .... |
| .... | .... | .... | .... | .... | .... |
| 1920 | 0.000224 | 187,200 | 188,200 | 187,200 | 188,200 |
| 1930 | 0.000183 | 187,200 | 163,073 | 187,200 | 188,200 |
| 1940 | 0.000153 | 162,240 | 137,946 | 187,200 | 188,200 |
| 1950 | 0.000123 | 137,280 | 112,820 | 187,200 | 37,440 |
| 1960 | 0.000089 | 112,320 | 87,693 | 37,440 | 37,440 |
| 1970 | 0.000063 | 87,200 | 62,566 | 37,440 | 37,440 |
| 1980 | 0.000049 | 62,400 | 37,440 | 37,440 | 37,440 |
| 1990 | 0.000038 | 37,440 | 37,440 | 37,440 | 37,440 |
| .... | .... | .... | .... | .... | .... |
| .... | .... | .... | .... | .... | .... |
| 2200 > | 0.000028 | 37,440 | 37,440 | 37,440 | 37,440 |
| Expected Return PV*: | | 55,226 | 56,210 | 55,900 | 57,312 |
| Investment: | | 51,920 | 51,920 | 51,920 | 51,920 |
| Net Return: | | 3,306 | 4,290 | 3,980 | 5,392 |

PRIMARY ORDER MATCHING  AS AT 95.01.01.17.38.07.00

*Expected Return PV=Present value of sum [Ordering party's assessed probabilities of occurence x Counterparty's contingent entitlement payout offer] at discount rate of 11% per annum.

** All offers satisfy Abbots & Taylor's minimum expected return (PV) of A$54,000.

FIG. 19B

Application ID: 001
ProductID: 10061

| | Carpenters' Offers | | | |
|---|---|---|---|---|
| | No 1 | No 2 | No 3 | No 4 |
| | 185,000 | 186,000 | 185,000 | 186,000 |
| | .... | .... | .... | .... |
| | .... | .... | .... | .... |
| | 185,000 | 186,000 | 185,000 | 186,000 |
| | 163,920 | 161,240 | 185,000 | 186,000 |
| | 142,840 | 136,480 | 185,000 | 186,000 |
| | 121,760 | 111,720 | 185,000 | 37,440 |
| | 100,680 | 86,960 | 185,000 | 37,440 |
| | 79,600 | 62,200 | 185,000 | 37,440 |
| | 58,520 | 37,440 | 185,000 | 37,440 |
| | 37,440 | 37,440 | 185,000 | 37,440 |
| | .... | .... | .... | .... |
| | 37,440 | 37,440 | 37,440 | 37,440 |
| | 54,120 | 55,111 | 54,914 | 56,213 ** |
| | 51,920 | 51,920 | 51,920 | 51,920 |
| | 2,200 | 3,191 | 2,994 | 4,293 |

FIG. 20

| | |
|---|---|
| APPLICATION SPECIFICATION | AS AT 91.06.03.17.00.00.00 |
| APPLICATION ID: | 001 |
| APPLICATION PROMOTER: | BLC INC |
| | |
| PRIMARY APPLICATION USE: | INVESTMENT MANAGEMENT |
| FEASIBLE COUNTERPARTY NUMBERS: | MULTIPLE COUNTERPARTIES |
| PUBLIC/PRIVATE USE: | PUBLIC USE |
| ACCEPTABLE COMMS MEDIUMS: | COMPUTER - COMPUTER LINK |
| RETAIL/WHOLESALE USE: | WHOLESALE USE |
| PRICING AND MATCHING PROCESS: | MAXIMIZE PRE-TAX EXPECTED RETURN ON CONSIDERATION INVESTMENT |
| CONTRACT REVALUATION FREQUENCY: | DAILY |
| ORDERING PARTIES ALLOWED NEGATIVE CONTRACT PAYOFFS? | YES |
| APPLICATION ACCESS LIMITATIONS: | NONE |

FIG. 21

| | |
|---|---|
| PRODUCT SPECIFICATION | AS AT 91.06.03.17.00.00.00 |
| PRODUCT ID: | 10061 |
| PRODUCT SUMMARY: | |
| APPLICATION ID: | 001 |
| APPLICATION PROMOTER: | BLC INC |
| PRODUCT SPECIFICATIONS: | |
| MARKET: | STOCK INDICES |
| SUB-MARKET: | PTSE 75 |
| MARKET TYPE: | SPOT |
| ESTABLISHMENT DATE/TIME: | 91.06.03.17.00.00.00 |
| MATURITY DATE/TIME: | 96.06.03.17.00.00.00 |
| CONSIDERATION/ENTITLEMENT DENOMINATION TYPE: | MONEY |
| CURRENCY TYPE(IF APPLICABLE): | COMMERCIAL BANK DEPOSIT |
| NATIONAL CURRENCY TYPE(IF APPLICABLE): | AUD |
| MINIMUM PRODUCT DEFINITION VALUE: | 1600 |
| MAXIMUM PRODUCT DEFINITION VALUE: | 2200 |
| PRODUCT STEP VALUE: | 10 |

FIG. 22

PRIMARY ORDER SPECIFICATION                    AS AT 95.01.01.17.37.06.00

ORDERING PARTY:                ABBOTTS & TAYLOR
ORDERING PARTY REFERENCE:      POZ 260

PRODUCT:
PRODUCT ID: 10061
MARKET: STOCK INDICES          SUB-MARKET: FTSE 75    MARKET TYPE: SPOT
ESTABLISHMENT DATE/TIME: 91.06.03.17.00.00.00         MATURITY DATE/TIME: 96.06.03.17.00.00.00

CONSIDERATION:
DENOMINATION TYPE:                          MONEY
CURRENCY TYPE (IF APPLICABLE):              COMMERCIAL BANK DEPOSIT
NATIONAL CURRENCY TYPE (IF APPLICABLE):     AUD
CONSIDERATION (INVESTMENT) AMOUNT:          51,920

ENTITLEMENT:
DENOMINATION TYPE:                          MONEY
CURRENCY TYPE (IF APPLICABLE):              COMMERCIAL BANK DEPOSIT
NATIONAL CURRENCY TYPE (IF APPLICABLE):     AUD
ENTITLEMENT SHAPE PARAMETERS:
       Product Values and Probabilities Feasible Product Values    Assessed Probabilities        Feasible Entitlement Shapes:
                              of Occurrence <                      0.000000
        1600                   0.000020
        1610                   0.000026
        1620                   0.000037
        1630                   0.000048
        ....                    .....
        2200                   0.000028
        >                      0.158835                  Minimum Expected Return PV: 54,000
                               _____                  Discount Rate: 11% pa
                               1.000000                  Net Return:>=0

FIG. 23A

```
ORDER SPECIFICATION PRICING                    AS AT 95.01.01.17.38.02.00

ORDER SPECIFICATION PRICING PARTY:   ABRAHAMSONS [Potential Counterparty No 1]

DEFINED CIRCUMSTANCES ID:  26      COMMISSION RATE:  1.25%
                                   DISCOUNT RATE: 10.00% pa
                                   COMPONENT PRODUCT PRICES: see Column 3 below
```

| Feasible Product Definition Values | Net Contingent Entitlement Amounts (A$000) | X | Component Product Prices [ID 26] | = | Implied Contingent Entitlement Amounts (A$000) |
|---|---|---|---|---|---|
| < | 0.00 | | | | |
| 1600 | (57.280) | | 0.000220 | | (0.0126) |
| 1610 | (57.280) | | 0.000227 | | (0.0130) |
| 1620 | (57.280) | | 0.000237 | | (0.0136) |
| 1630 | (57.280) | | 0.000249 | | (0.0143) |
| 1640 | (57.280) | | 0.000266 | | (0.0152) |
| 1650 | (57.280) | | 0.000287 | | (0.0164) |
| 1660 | (57.280) | | 0.000314 | | (0.0180) |
| .... | .... | | .... | | .... |
| .... | .... | | .... | | .... |
| 2130 | (57.280) | | 0.029642 | | (1.6979) |
| 2140 | (57.280) | | 0.028625 | | (1.6396) |
| 2150 | (57.280) | | 0.027469 | | (1.5734) |
| 2160 | (57.280) | | 0.026193 | | (1.5003) |
| 2170 | (57.280) | | 0.024819 | | (1.4216) |
| 2180 | (57.280) | | 0.023369 | | (1.3386) |
| 2190 | (57.280) | | 0.021865 | | (1.2524) |
| 2200 | (57.280) | | 0.020330 | | (1.1645) |
| > | 0.000 | | 0.146635 | | 0.000 |
| | | | 1.0402 | | (59.580) |

```
Base Contract Bid Price(in Product Denomination terms):       59.580
Net Present Value (at 10.00% pa):                             51.280
+ Flat Commission (1.25%)                                      0.640
= Contract Bid Price (in Product Denomination Terms):         51.920
Implied Base Margin on Contract:
```

FIG. 23B

Application ID: 001
ProductID: 10061

| Net Contingent Entitlement Amounts (A$000) | X | Assessed Probabilities of Occurrence | = | Net Contingent Entitlement (Valuation) Amounts (A$000) | Net Contingent Negative Entitlement (Valuation) Amounts (A$000) | Maximum Absolute Negative Entitlement Amount (A$000) |
|---|---|---|---|---|---|---|
| 0.000 | | | | | | |
| (57.280) | | 0.000020 | | (0.0011) | (0.0011) | (57.280) |
| (57.280) | | 0.000027 | | (0.0015) | (0.0015) | |
| (57.280) | | 0.000037 | | (0.0021) | (0.0021) | |
| (57.280) | | 0.000049 | | (0.0028) | (0.0028) | |
| (57.280) | | 0.000066 | | (0.0038) | (0.0038) | |
| (57.280) | | 0.000087 | | (0.0050) | (0.0050) | |
| (57.280) | | 0.000114 | | (0.0065) | (0.0065) | |
| .... | | .... | | .... | .... | |
| .... | | .... | | .... | .... | |
| (57.280) | | 0.029442 | | (1.6864) | (1.6864) | |
| (57.280) | | 0.028425 | | (1.6282) | (1.6282) | |
| (57.280) | | 0.027269 | | (1.5620) | (1.5620) | |
| (57.280) | | 0.025993 | | (1.4889) | (1.4889) | |
| (57.280) | | 0.024619 | | (1.4102) | (1.4102) | |
| (57.280) | | 0.023169 | | (1.3271) | (1.3271) | |
| (57.280) | | 0.021665 | | (1.2410) | (1.2410) | |
| (57.280) | | 0.020130 | | (1.1530) | (1.1530) | |
| 0.000 | | 0.158835 | | 0.000 | 0.000 | |
| | | 1.0000 | | (57.280) | (57.280) | (57.280) |

```
ORDER SPECIFICATION PRICING                    AS AT 95.01.01.17.38.02.00

ORDER SPECIFICATION PRICING PARTY:   CARPENTERS [Potential Counterparty No 2]

DEFINED CIRCUMSTANCES ID:  17        COMMISSION RATE: 1.30%
                                     DISCOUNT RATE: 9.8% pa
                                     COMPONENT PRODUCT PRICES: see Column 3 below
```

| Feasible Product Definition Values | Net Contingent Entitlement Amounts (A$000) | X | Component Product Prices [ID 17] | = | Implied Contingent Entitlement Amounts (A$000) |
|---|---|---|---|---|---|
| <    | 0.00     |   |          |   |          |
| 1600 | (57.860) |   | 0.000220 |   | (0.0127) |
| 1610 | (57.860) |   | 0.00023  |   | (0.0131) |
| 1620 | (57.860) |   | 0.00024  |   | (0.0137) |
| 1630 | (57.860) |   | 0.00025  |   | (0.0144) |
| 1640 | (57.860) |   | 0.00027  |   | (0.0153) |
| 1650 | (57.860) |   | 0.00029  |   | (0.0166) |
| 1660 | (57.860) |   | 0.00031  |   | (0.0182) |
| .... | ....     |   | ....     |   | ....     |
| .... | ....     |   | ....     |   | ....     |
| 2130 | (57.860) |   | 0.029641 |   | (1.7150) |
| 2140 | (57.860) |   | 0.028625 |   | (1.6562) |
| 2150 | (57.860) |   | 0.027469 |   | (1.5894) |
| 2160 | (57.860) |   | 0.026192 |   | (1.5155) |
| 2170 | (57.860) |   | 0.024819 |   | (1.4360) |
| 2180 | (57.860) |   | 0.023369 |   | (1.3521) |
| 2190 | (57.860) |   | 0.021864 |   | (1.2651) |
| 2200 | (57.860) |   | 0.020330 |   | (1.1763) |
| >    | 0.000    |   | 0.146635 |   | 0.000    |
|      |          |   | 1.0300   |   | (59.600) |

```
Base Contract Bid Price (in Product Denomination terms):   59.600
Net Present Value (at 9.8% pa):                            51.310
+ Flat Commission (1.30%)                                   0.610
= Contract Bid Price (in Product Denomination Terms):      51.920
Implied Base Margin on Contract:
```

FIG. 25B

Application ID: 001
ProductID: 10061

| Net Contingent Entitlement Amounts (A$000) | X | Assessed Probabilities of Occurrence | = | Net Contingent Entitlement (Valuation) Amounts (A$000) | Net Contingent Negative Entitlement (Valuation) Amounts (A$000) | Maximum Absolute Negative Entitlement Amount (A$000) |
|---|---|---|---|---|---|---|
| 0.000 | | | | | | |
| (57.860) | | 0.000020 | | (0.0012) | (0.0012) | (57.860) |
| (57.860) | | 0.000027 | | (0.0016) | (0.0016) | |
| (57.860) | | 0.000037 | | (0.0021) | (0.0021) | |
| (57.860) | | 0.000049 | | (0.0028) | (0.0028) | |
| (57.860) | | 0.000066 | | (0.0038) | (0.0038) | |
| (57.860) | | 0.000087 | | (0.0050) | (0.0050) | |
| (57.860) | | 0.000114 | | (0.0066) | (0.0066) | |
| .... | | .... | | .... | .... | |
| .... | | .... | | .... | .... | |
| (57.860) | | 0.029442 | | (1.7035) | (1.7035) | |
| (57.860) | | 0.028425 | | (1.6447) | (1.6447) | |
| (57.860) | | 0.027269 | | (1.5778) | (1.5778) | |
| (57.860) | | 0.025993 | | (1.5040) | (1.5040) | |
| (57.860) | | 0.024619 | | (1.4245) | (1.4245) | |
| (57.860) | | 0.023169 | | (1.3406) | (1.3406) | |
| (57.860) | | 0.021665 | | (1.2535) | (1.2535) | |
| (57.860) | | 0.020130 | | (1.1647) | (1.1647) | |
| 0.000 | | 0.158835 | | 0.000 | 0.000 | |
| | | 1.0000 | | (57.860) | (55.120) | (57.860) |

49.760

1.550

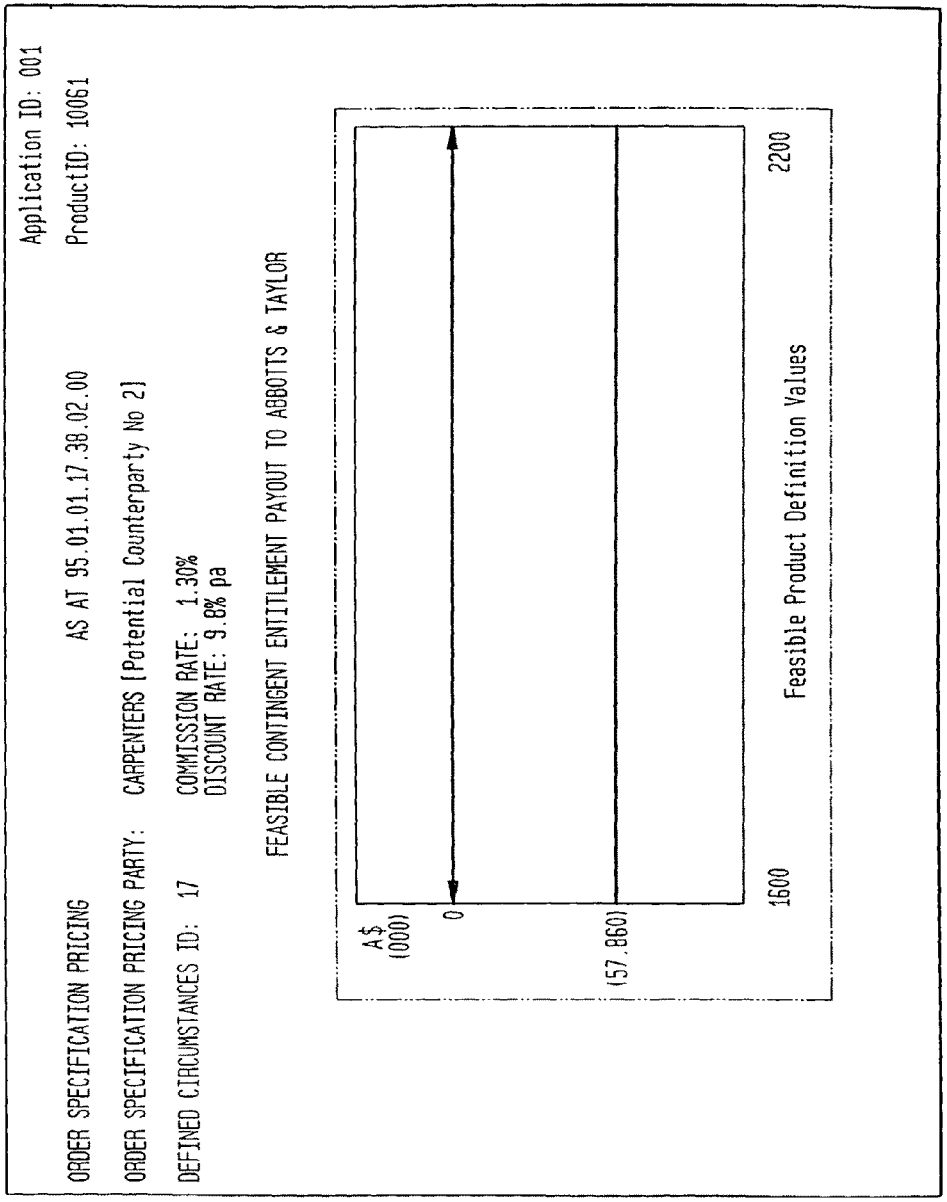

FIG. 27A

| Feasible Product Values | Ordering Party Assessed Probabilities of Occurrence | Counterparty Contingent Entitlement Payout (A$) |
|---|---|---|
| | | Abrahamsons' Offer |
| < 1600 | 0.000020 | 57,280 |
| .... | .... | .... |
| .... | .... | .... |
| 1920 | 0.000224 | 57,280 |
| 1930 | 0.000183 | 57,280 |
| 1940 | 0.000153 | 57,280 |
| 1950 | 0.000123 | 57,280 |
| 1960 | 0.000089 | 57,280 |
| 1970 | 0.000063 | 57,280 |
| 1980 | 0.000049 | 57,280 |
| 1990 | 0.000038 | 57,280 |
| .... | .... | .... |
| .... | .... | .... |
| 2200 > | 0.000028 | 57,280 |

PRIMARY ORDER MATCHING      AS AT 95.01.01.17.38.07.00

Expected Return PV*:        42,730

Investment:                 51,920

Net Return:                 (9,190)

*Expected Return PV=Present value of sum [Ordering party's assessed probabilities of occurrence x Counterparty's contingent entitlement payout offer] at discount rate of 11% per annum

** Neither offer satisfies Abbotts & Taylor's minimum expected return (PV) of $A 54,000.

** Neither offer satisfies Abbotts & Taylor's requirement of a positive net return.

FIG. 28

| | |
|---|---|
| APPLICATION SPECIFICATION | AS AT 91.06.03.17.00.00.00 |
| APPLICATION ID: | 201 |
| APPLICATION PROMOTER: | BLC INC |
| | |
| PRIMARY APPLICATION USE: | INVESTMENT MANAGEMENT |
| FEASIBLE COUNTERPARTY NUMBERS: | MULTIPLE COUNTERPARTIES |
| PUBLIC/PRIVATE USE: | PUBLIC USE |
| ACCEPTABLE COMMS MEDIUMS: | COMPUTER - COMPUTER LINK |
| RETAIL/WHOLESALE USE: | WHOLESALE USE |
| PRICING AND MATCHING PROCESS: | MAXIMIZE PRE-TAX EXPECTED RETURN ON CONSIDERATION INVESTMENT |
| CONTRACT REVALUATION FREQUENCY: | DAILY |
| ORDERING PARTIES ALLOWED NEGATIVE CONTRACT PAYOFFS? | YES |
| APPLICATION ACCESS LIMITATIONS: | NONE |

FIG. 29

| | |
|---|---|
| PRODUCT SPECIFICATION | AS AT 91.06.03.17.00.00.00 |
| PRODUCT ID: | 11099 |
| PRODUCT SUMMARY: | |
| APPLICATION ID: | 201 |
| APPLICATION PROMOTER: | BLC INC |
| PRODUCT SPECIFICATIONS: | |
| MARKET: | STOCK INDICES |
| SUB-MARKET: | PTSE 75 |
| MARKET TYPE: | SPOT |
| ESTABLISHMENT DATE/TIME: | 91.06.03.17.00.00.00 |
| MATURITY DATE/TIME: | By contract, at order matching |
| CONSIDERATION/ENTITLEMENT DENOMINATION TYPE: | MONEY |
| CURRENCY TYPE(IF APPLICABLE): | COMMERCIAL BANK DEPOSIT |
| NATIONAL CURRENCY TYPE(IF APPLICABLE): | AUD (CONSIDERATION) and USD (ENTITLEMENT) |
| MINIMUM PRODUCT DEFINITION VALUE: | Not Applicable |
| MAXIMUM PRODUCT DEFINITION VALUE: | Not Applicable |
| PRODUCT STEP VALUE: | Not Applicable |

FIG. 30

PRIMARY ORDER SPECIFICATION                AS AT 92.06.03.17.00.00.000

ORDERING PARTY:              ABBOTTS & TAYLOR
ORDERING PARTY REFERENCE:    PQZ 260

PRODUCT:
PRODUCT ID: 11099
MARKET: STOCK INDICES                    SUB-MARKET: FTSE 75           MARKET TYPE: SPOT
ESTABLISHMENT DATE/TIME: 91.06.03.17.00.00.00
MATURITY DATE/TIME: By contract, at order matching CONSIDERATION:                                    MONEY
DENOMINATION TYPE:                                COMMERCIAL BANK DEPOSIT
CURRENCY TYPE (IF APPLICABLE):                    AUD
NATIONAL CURRENCY TYPE (IF APPLICABLE):           102,900
SPECIFIED CONSIDERATION AMOUNT:

ENTITLEMENT:                                      MONEY
DENOMINATION TYPE:                                COMMERCIAL BANK DEPOSIT
CURRENCY TYPE (IF APPLICABLE):                    USD
NATIONAL CURRENCY TYPE (IF APPLICABLE):           70,000
MINIMUM ENTITLEMENT AMOUNT:

FIG. 31A

```
ORDER SPECIFICATION PRICING                    AS AT 92.06.03.17.38.02.00
ORDER SPECIFICATION PRICING PARTY:   ABRAHAMSONS [Potential Counterparty No 1]
DEFINED CIRCUMSTANCES ID:  54        COMMISSION RATE:  1.25%
                                     DISCOUNT RATE: Not Applicable
                                     ENTITLEMENT/CONSIDERATION EXCHANGE RATE: 1.210
```

| Feasible Product Definition Values | Net Contingent Entitlement Amounts (US$000) | X | Component Product Prices [ID 54] | = | Implied Contingent Entitlement Amounts (US$000) |
|---|---|---|---|---|---|
| Not Applicable | (84.00) | | 1.0000 | | (84.00) |
| | | | 1.0000 | | (84.00) |

```
Base Contract Bid Price (in AUD @ 1.210 exchange rate):        101.620
Net Present Value:                                             101.620
+ Flat Commission (1.25%)                                        1.280
= Contract Bid Price (in Product Denomination Terms): (A$000)  102.900
Implied Base Margin on Contract:
```

FIG. 31B

Application ID: 201
ProductID: 11099

| Net Contingent Entitlement Amounts (US$000) | X | Assessed Probabilities of Occurrence | = | Net Contingent Entitlement (Valuation) Amounts (US$000) | Net Contingent Negative Entitlement (Valuation) Amounts | Maximum Absolute Negative Entitlement Amount |
|---|---|---|---|---|---|---|
| (84.00) | | 1.0000 | | (84.00) | | |
| | | 1.0000 | | (84.00) | | |
| | | | | NA | | |
| | | | | NA | | |

FIG. 32A

| | | | |
|---|---|---|---|
| ORDER SPECIFICATION PRICING | | AS AT 92.06.03.17.38.02.00 | |
| ORDER SPECIFICATION PRICING PARTY: | | CARPENTERS INC [Potential Counterparty No 2] | |
| DEFINED CIRCUMSTANCES ID: 27 | | COMMISSION RATE: 1.30% | |
| | | DISCOUNT RATE: Not Applicable | |
| | | ENTITLEMENT/CONSIDERATION EXCHANGE RATE: 1.239 | |

| Feasible Product Definition Values | Net Contingent Entitlement Amounts (US$000) | × | Component Product Prices [ID 27] | = | Implied Contingent Entitlement Amounts (US$000) |
|---|---|---|---|---|---|
| Not Applicable | (82.00) | | 1.0000 | | (82.00) |
| | | | 1.0000 | | (82.00) |

Base Contract Bid Price (in AUD @ 1.239 exchange rate):     101.563
Net Present Value:     101.563
+ Flat Commission (1.30%)     1.337
= Contract Bid Price (in Product Denomination Terms): (A$000)     102.900
Implied Base Margin on Contract:

FIG. 32B

Application ID: 201
ProductID: 11099

| Net Contingent Entitlement Amounts (US$000) | x | Assessed Probabilities of Occurrence | = | Net Contingent Entitlement (Valuation) Amounts (US$000) | Net Contingent Negative Entitlement (Valuation) Amounts | Maximum Absolute Negative Entitlement Amount |
|---|---|---|---|---|---|---|
| (82.00) | | 1.0000 | | (82.00) | | |
| | | 1.0000 | | (82.00) | | |
| | | | | NA | | |
| | | | | NA | | |

METHODS AND APPARATUS RELATING TO THE FORMULATION AND TRADING OF INVESTMENT CONTRACTS

CROSS REFERENCE TO RELATED APPLICATIONS

This application is a continuation of U.S. patent application Ser. No. 10/615,796, filed Jul. 10, 2003, which will issue as U.S. Pat. No. 7,617,147 on Nov. 10, 2009, which is a continuation of U.S. patent application Ser. No. 09/667,423, filed Sep. 21, 2000, now U.S. Pat. No. 6,622,130, which is a continuation of U.S. patent application Ser. No. 09/000,264, filed May 15, 1998, now U.S. Pat. No. 6,157,918, which is a 371 of International Application No. PCT/AU96/00420 filed Jul. 5, 1996. Application Ser. Nos. 09/667,423, 09/000,264, and PCT/AU96/00420 are each incorporated herein in their entireties.

FIELD OF THE INVENTION

The present invention is directed to methods and apparatus relating to the formulation and trading of investment contracts. In one particular non-limiting form, the invention is directed to methods and apparatus that allow parties to invest a defined sum by way of pricing and matching a contract with one of a possible number of unidentified counterparties to achieve the best return (or entitlement) on maturity of the contract for a specified consideration.

BACKGROUND OF THE INVENTION

Reference can be had to International Patent Applications No. PCT/AU93/00250 and PCT/AU95/00827 that describe methods and apparatus for the formulation and trading of risk management contracts. These applications describe ways in which individuals and enterprises can manage risk of an economic nature with which they are faced in a manner that can be thought of as akin to hedging or lending. The present invention is concerned rather with the desire to invest available resources in the expectation of receiving the best available return at a future time.

The need of entities and individuals to make investments with the aim of gaining future returns is universal and well known. In general, investors look for opportunities to earn the highest possible returns from investments that fit within their individual risk profiles and with their other investment criteria, such as type and tradeability of asset, investment price, investment growth and income potential, investment timing and regulatory regime, and so on. While the differing needs of investors lead them to a great diversity of investments, all investors share the common goal of seeking to limit the risk in any investment as much as possible.

One major disadvantage is the lack of direct control that investors have over investment risk. For example, investors cannot directly limit the risk they assume when investing in products such as shares, or financial instruments such as foreign exchange or interest rate products. Instead, investors are exposed at all times to the market prices of these products and have no mechanisms for limiting their exposure either at the time the investment is made or subsequently. When, therefore, there is high volatility in these markets, investors may suffer devastating losses.

This disadvantage is serious in countries where pension retirement funds are replacing government-funded pensions as a major source of income security for people in retirement. As is well known, the values of these funds vary unpredictably from month to month and year to year, reflecting volatility in the underlying shares, property and other assets in the funds. Individual investors are exposed to all these changes in value and cannot place limits on their risk.

A second major disadvantage lies in the fact that investors do not have mechanisms for making contracts that are customised to meet the needs of both investor and counterparty. For example, bank term deposits are a common form of personal investment. For individual investors, they have the advantages of a fixed nominal return and low entry and exit fees. However, the terms of the investment are set only by the counterparty (i.e. the bank) and then offered to investors on a take-it-or-leave-it basis. There is no scope for investors to negotiate, for a price, the terms of these investments to better suit their individual needs.

A third major disadvantage is that individual investors cannot afford the fees that are involved with most investment products. For example, shares must be bought through brokers on stock exchanges, and their fees effectively deter the great majority of investors from investing directly in share markets.

It is an objective of the present invention to overcome or at least ameliorate one or more disadvantages in the investment contracts and contracting mechanisms that are now available to investors.

SUMMARY OF THE INVENTION

In one form, the invention discloses a data processing system to enable the formulation of multi-party investment contracts, the system comprising:

input means by which an ordering party can input contract data relating to at least one phenomenon, each said phenomenon having a range of future outcomes and a future time of maturity, the contract data including a set of probabilities of occurrence for each outcome in said range and a consideration due to a counterparty at or after the time of matching, and further by which at least one counterparty can input registering data including a set of probabilities of occurrence for each outcome in said range; and data processing means operable to price and match a contract for a said phenomenon from said contract data and said registering data, the pricing including:
  applying at least one template of entitlement as a function of outcome to each counterparty's set of probabilities to give one or more individual counterparty prices each equal to the ordering party's consideration; and
  applying the ordering party set of probabilities to each said template to derive an implied entitlement;

the matching including:
  determining which counterparty will provide the best entitlement on maturity by comparing each implied entitlement with the consideration; and
  matching the contract with that counterparty having the template for the best said comparison.

Preferably, in the pricing, application of a template results in the multiplication of each elemental entitlement with each probability and the summing of the products. Further, a discount factor is applied to the sum to give a present day price relative to the time of maturity.

In the matching, each template is applied to the ordering party set of probabilities, and a multiplication of the elemental entitlements with each probability performed, and the products summed to give the implied entitlement.

The said sum can have a discount rate applied to give a present day value relative to the time of maturity. The ordering party discount rates can be different between different types of counterparties.

The contract data can further include a minimum expected entitlement against which the counterparty prices are compared for the purpose of accepting ones thereof for the matching.

The invention further discloses a method for the formulation of multi-party investment contracts, the method comprising the steps of:

inputting ordering party contract data relating to at least one phenomenon, each said phenomenon having a range of future outcomes and a future time of maturity, the contract data including a set of probabilities of occurrence for each outcome in said range and a consideration due to a counterparty at or after the time of establishment;

inputting counterparty registering data including a set of probabilities of occurrence for each outcome in said range; and pricing and matching a contract for a said phenomenon from said contract data and said registering data, said step of pricing, for each counterparty, including:

applying at least one template of entitlement as a function of outcome to the set of probabilities to give one or more individual counterparty prices; and applying the ordering party set of probabilities to each individual counterparty template to derive an implied entitlement;

said step of matching including:

determining which counterparty will provide the best entitlement on maturity by comparing the implied entitlements with the consideration;

and matching the contract with the counterparty having the template for the best said comparison.

Embodiments of the invention can overcome the disadvantages in existing investment mechanisms and contracts. Firstly, it enables investors to place specific limits on the risk that they were prepared to tolerate in the investment before entering the investment contract. Second, it enables investors to construct and tailor their specific investment requirements into a contract that could then be offered to counterparties in the market for matching purposes. Thirdly, it enables investors to make contracts with counterparties without the high costs of intermediaries.

DESCRIPTION OF THE DRAWINGS

Embodiments of the invention now will be described with reference to the accompanying drawings, in which:

FIGS. 6 to 19B show charts associated with Example I;

FIGS. 20 to 27B show charts associated with Example II; and

FIGS. 28 to 32B show charts associated with Example III.

DESCRIPTION OF PREFERRED
EMBODIMENTS AND BEST MODE OF
PERFORMANCE

Figure 1:
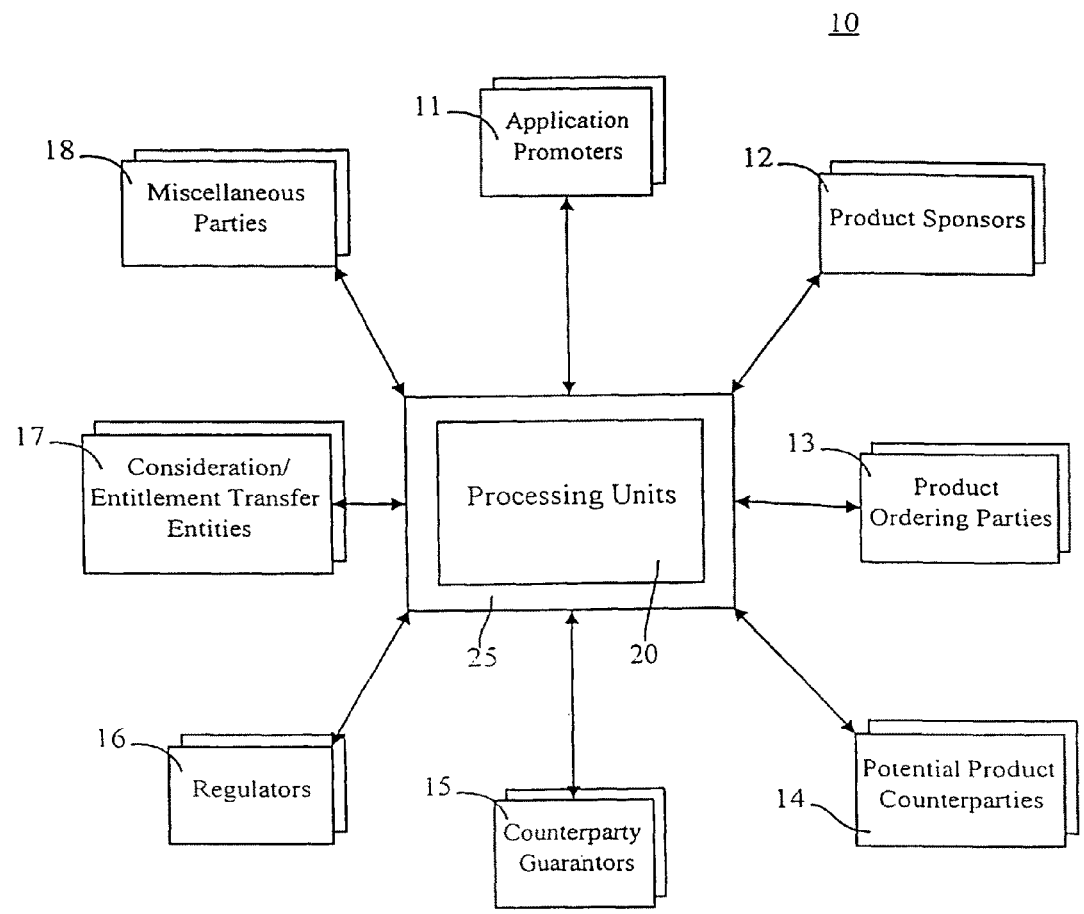
FIG. 1 is a block diagram of a generic system embodying the invention.

FIG. 1 shows a block diagram of the generic system 10 embodying the invention. The various stakeholders or parties to the system 10 each have access to a centralised processing unit 20. The processing units 20 can be constituted by one or more data processing apparatus, with each one thereof providing access for any one or more of the various stakeholders to applications software supported by the system 10, as all the processing units are interconnected. Access to the one or more data processing apparatus is controlled by a generic form of communications co-ordination and security processing unit 25.

FIG. 1 also indicates that there are a number of types of stakeholder, and a number of individual stakeholders within each stakeholder type. The basic types of stakeholder are described as: applications promoters 11, product sponsors 12, product ordering parties 13, potential product counterparties 14, counter-party guarantors 15, regulators 16, consideration/entitlement transfer ('accounting') entities 17, and miscellaneous parties 18. The number of types of stakeholder represented in FIG. 1 is typically the largest that will be supported by the system 10.

Figure 2A:
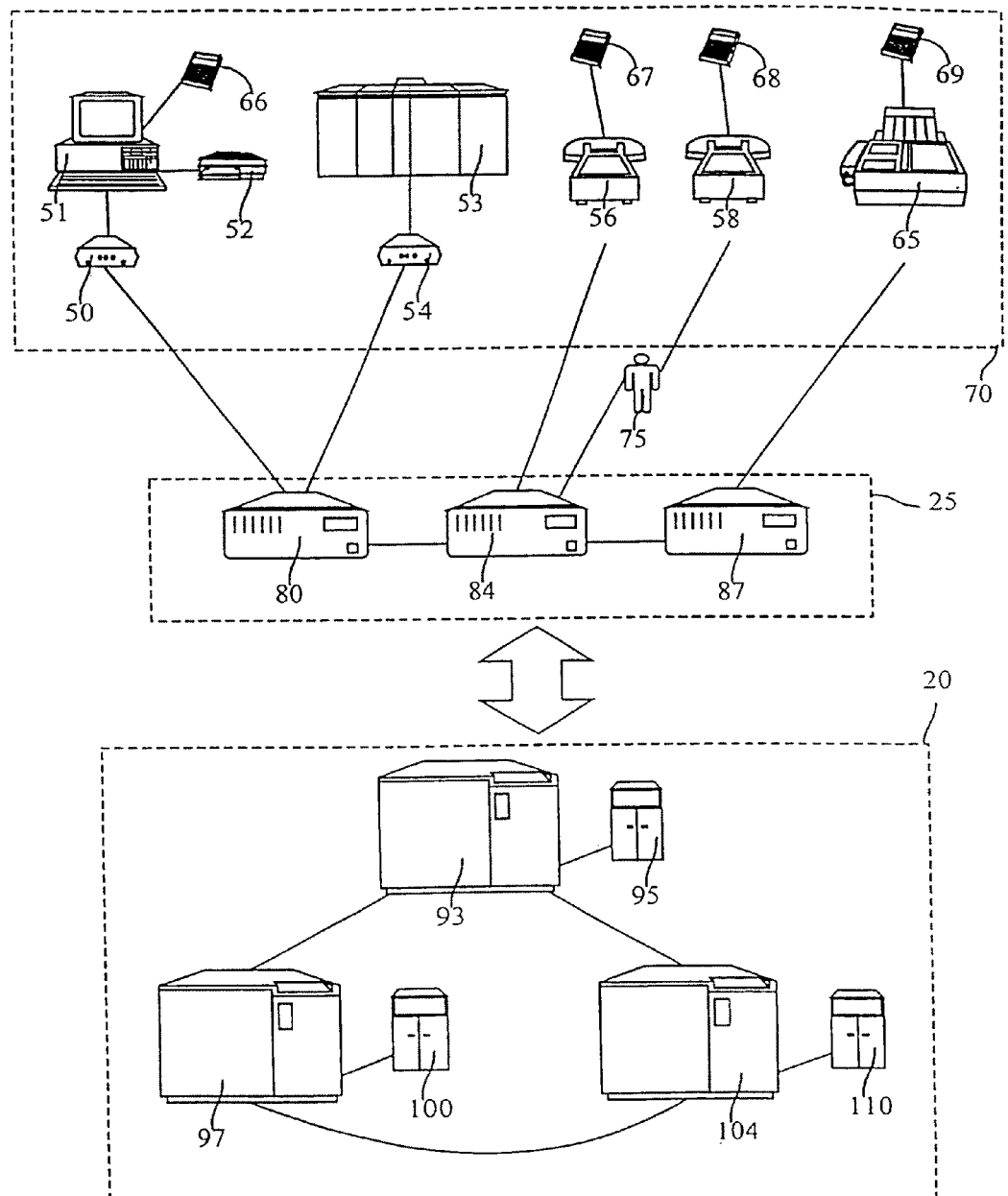
FIG. 2a is a block diagram of an indicative hardware platform supporting the system of FIG. 1.

An embodiment of a computer system for the system 10 is shown in FIG. 2a. The core of the system hardware is a collection of data processing units. In the embodiment described, the processing unit 20 comprises three inter-linked data processors 93,97,104, such as the Sun 670 MP manufactured by Sun Microsystems, Inc. of the USA. Each processing unit 93,97,104 runs operational system software, such as Sun Microsystems OS 4.1.2, as well as applications software. The processor configuration shown in FIG. 1 represents a large system designed to handle the transactions of thousands of stakeholders, the input and output data generated by those stakeholders, and risk management contract pricing, matching and subsequent processing functions.

Each processing unit 93,97,104 has connection with it one or more mass data storage units 95,100,110 to store all data received from stakeholders, and other data relating to all other software operations generating or retrieving stored information. Suitable mass storage units are, for example, such as those commercially available from Sun Microsystems.

A number of communications controllers 80,84,87, forming the communications co-ordination and security processing unit 25, are coupled with the processing unit 20. These controllers effect communications between the processing units 93,97,104 and the various external hardware devices used by the stakeholders to communicate data or instructions to or from the processing units. The communications controllers are such as the Encore ANNEX II, the IBM AS/400 server or the CISCO Systems AGS+.

A large range of communications hardware products are supported, and collectively are referred to as the stakeholder input/output devices 70. One amongst many of the communication devices 70 are personal computers 51 and associated printers 52, which have communications connection with the communications controller 80 by means of a modem 50. There can also be an external host device 53, such as a mini or mainframe computer, again linked with the communications controller 80 by means of a modem 54. In other forms, communications can be established simply by means of a tone dialing telephone 56, which provides for the input of instructions or data by use of the tone dialing facility itself. In the alternative, a voice connection via an operator 75 can be effected by a conventional telephone 58. Both these external devices are shown connected with the communications controller 84. A further possibility is to have data transfer by means of a facsimile machine 65, in this case shown linked to the communications controller 87.

In all cases, users of the input devices are likely to be required to make use of system access password generation and encryption devices such as the Racal RG 500 Watchword Generator 66,67,68,69, (for personal use) and the Racal RG 1000, which is incorporated in a mainframe computer 53. The corresponding decoding units for these devices are incorporated in the communications controllers 80,84,87.

The generic processing unit 20 also includes a large number of 'portable' information recordal devices, such as printers, disc drives, and the like, which allow various forms of information to be printed or otherwise written to storage media to be transferable. This is particularly appropriate where confirmatory documentation of matched risk contracts is required to be produced, either for safekeeping as a hard copy record, else to be forwarded to any one or more of the stakeholders that are a party to each individual matched contract.

The generic system 10 shown in FIG. 1 encompasses many varied configurations, relating not only to the number and types of stakeholders, but also the 'architectures' realisable by the system hardware and software in combination. In that sense the arrangement shown in FIG. 2a is to be considered only as broadly indicative of one type of hardware configuration that may be required to put the system into effect.

Figure 2B:
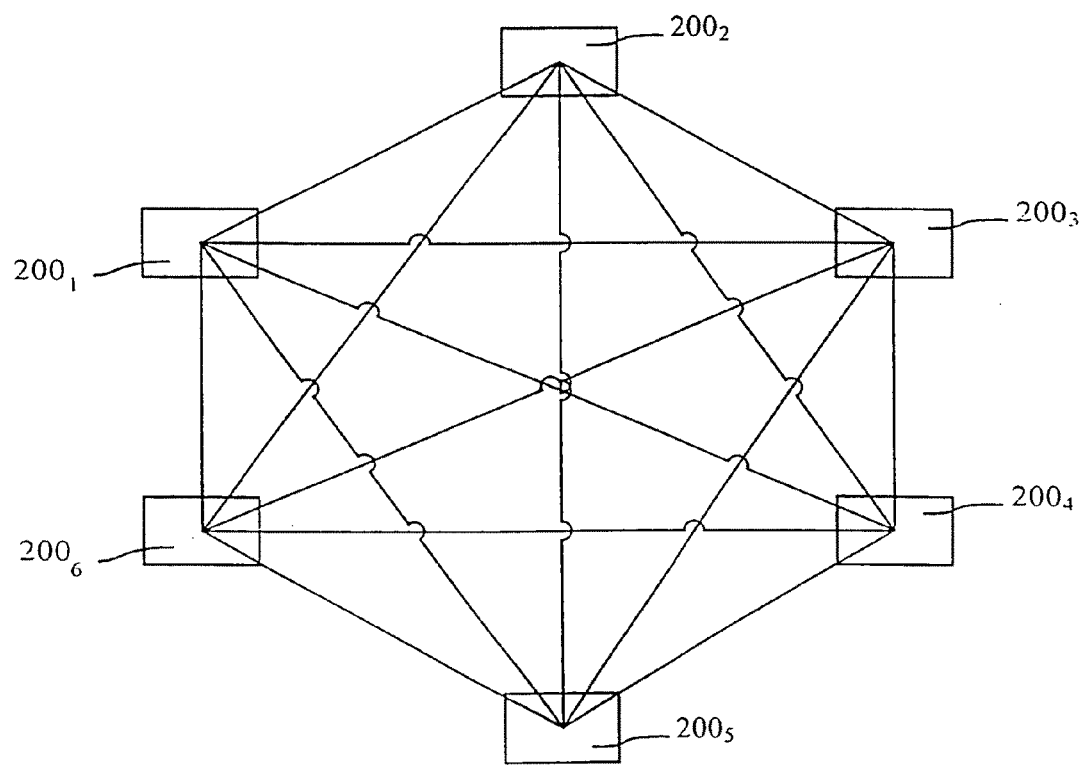
FIG. 2b is an alternative hardware platform that does not rely on a centralised hub data processing unit.

For example, FIG. 2b shows an alternate configuration that does not rely upon a centralised (hub) data processing unit, rather the necessary processing is performed locally at each stakeholder site $200_n$ by means of distributed software.

Example I

This embodiment relates to an investment contract and describes the formulation of a contract based on potential future movements in the value of the fictional PTSE 75 index of share prices. In summary, the example shows how the system enables one party (such as an institutional fund manager) seeking to gain from a significant decline in the value of the PTSE 75 index in the future, specifically a decline by June 1996, relative to the assumed current (January 1995) value of the index to make a contract with another, as-yet-unknown, party, such as another fund manager seeking to gain from a significant increase in PTSE 75 index value. The specific offering is one which provides a contract ordering party with a yet-to-be-specified contingent entitlement to an Australian dollar future payout from a yet-to-be-identified counterparty (i.e. at maturity of the contract) upon the ordering party's investment of a specified consideration amount.

The future money entitlement is contingent on two factors. The first is the value, at contract maturity date, of the value of the PTSE 75 index. The second is the ultimate "shape" of the contingent entitlement function template that is determined by the system based on ordering and registering information provided respectively by the ordering party and potential counterparties.

In this example, the relevant key stakeholders are an application promoter (BLC Inc), various product sponsors (the relevant one for the example being BLC Inc itself), various product ordering parties (the relevant one for the example being Abbotts & Taylor), various potential counterparties (the relevant ones for the example being Abrahamsons and Carpenters Inc), a counterparty guarantor (CNZ Banking Corporation) and an application regulator (the Pacific Central Bank).

Figure 3:
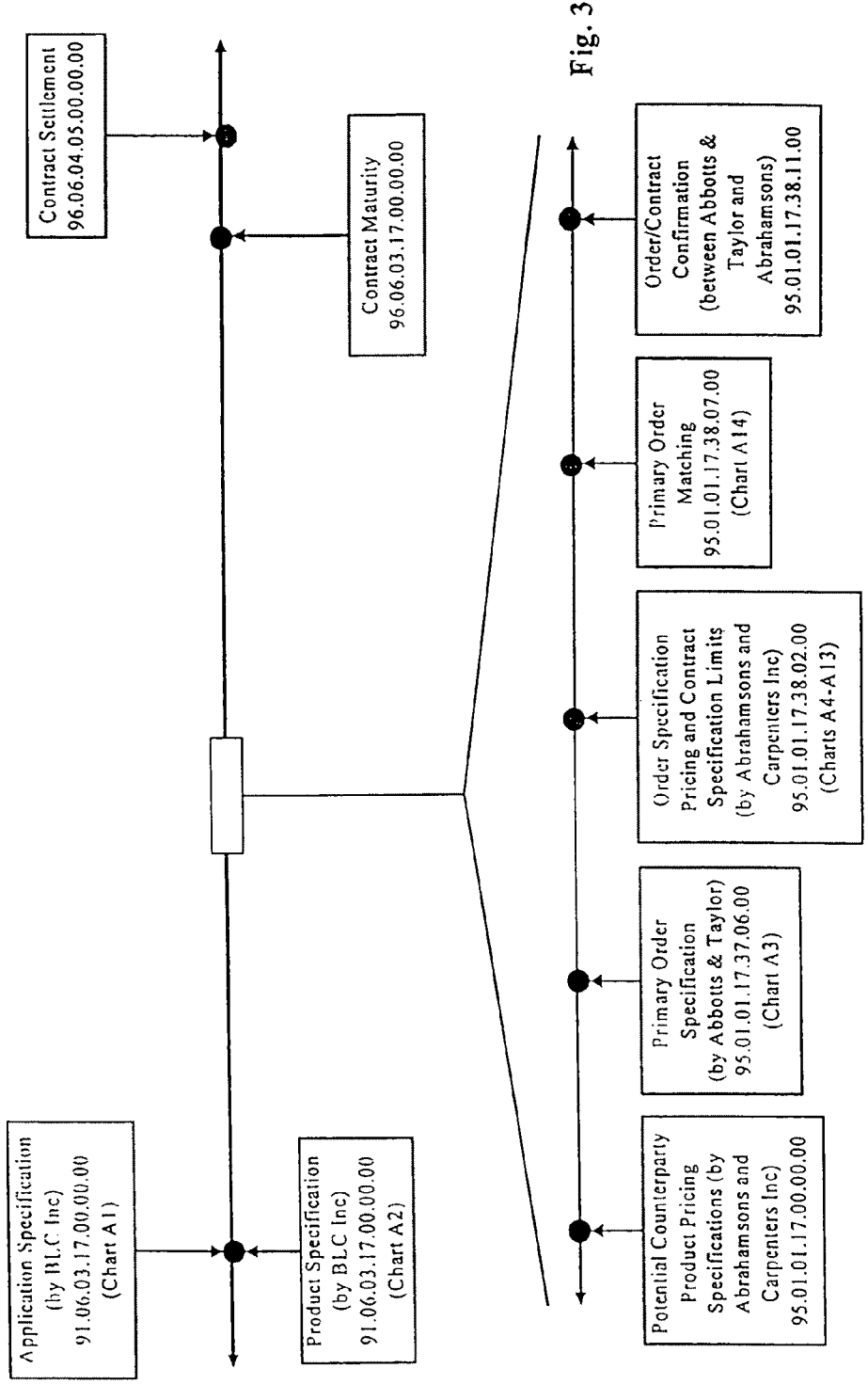
FIG. 3 is a timeline showing the steps of Example I.

The timeline depicting the steps in the contract from the first step, Application Specification, to the final step, Contract Settlement, is shown in FIG. 3. The pages designated FIGS. 6 to 11B contain detailed explanatory charts supporting FIG. 3. These pages are to be read together with the following description.

Looking at the first step in the timeline, Application Specification, in conjunction with FIG. 6, we see that BLC Inc. established a contract APP (Application ID 001) on 91.06.03.17.00.00 (that is, 5 pm on Jun. 3, 1991) to deal with investment. The application involves a pricing and matching objective function of: "maximise pre-tax expected return on consideration investment". As a system instruction this means: identify a counterparty (or counterparties) who have defined pricing and limit parameters which, when combined with the ordering party's specified consideration, will yield an entitlement payout shape that maximises the ordering party's pre-tax expected return on consideration investment subject to whatever match constraints the ordering party and/or counterparty has specified. Application ID 001 supports a range of products.

Looking at the second step in the timeline, Product Specification, in conjunction with FIG. 7, we see that BLC Inc was also product sponsor of Product 10061 at the same time (91.06.03.17.00.00). This product relates to the market termed Stock Indices and to the sub-market termed PTSE 75. The maturity date for Product 10061 is 96.06.03.17.00.00.00. The consideration for a specific contract involving Product 10061 is in the form of commercial bank deposits denominated in Australian dollars. The entitlement is also in the form of commercial bank deposits denominated in Australian dollars, payable (if necessary) immediately after the Product's specified maturity date/time.

Looking at the third step in the timeline, Potential Counterparty Product Pricing Specifications, one can find two entities, Abrahamsons and Carpenters Inc, acting as potential counterparties for forthcoming primary product orders dealing with Product 10061. At this point in the timeline (95.01.01.17.00.00.00), 42 months after the specification of Product 10061, both Abrahamsons and Carpenters Inc have currently-specified parameters for pricing potentially forthcoming orders for the product.

Figure 8:

Looking at the fourth step in the timeline, Primary Order Specification, in conjunction with FIG. 8, it can be seen that an ordering party, Abbotts & Taylor, is seeking a contract, from an offering party, in Product 10061 at that time (95.01.01.17.37.06.00). FIG. 8 shows the specific parameters that Abbotts & Taylor has defined for the contract it is seeking at this time, including a desired investment consideration amount of A$51,920. For this investment of A$51,920, Abbotts & Taylor has specified a minimum present value expected return of A$54,000 together with a preparedness to accept a worst case outcome of loss of 28 percent of the investment, that is A$14,480.

Abbotts & Taylor has the opportunity to constrain the system's determination of possible payout shapes. Note that these are two templates constituting a capped, downward sloping (45-degree) shape and a capped perpendicular (90-degree) shape. In the preferred embodiment, an ordering party will not specify particular shapes and thus the matching system would explore all possible entitlement payout shapes.

Looking at the fifth step in the timeline, Order Specification Pricing and Contract Specification Limits, in conjunction with FIGS. 9A and 9B, the potential counterparty No. 1 Abrahamsons, has provided registering data in the form of assessed probabilities of occurrence, a discount rate from the time of maturity to the present day, a flat commission rate, and a maximum negative entitlement amount. Abrahamsons' pricing parameters indicate that their appropriate defined circumstances ID for an ordering party such as Abbotts & Taylor is 26, which implies a commission rate of 1.25%, a discount rate of 10.00% pa, a particular set of component product prices (as shown) and a particular set of assessed probabilities of occurrence (as shown). It can further be seen that the system 20 determines, for Abrahamsons, a feasible set of net contingent entitlement amounts both Abrahamsons and Abbotts & Taylor would judge worthwhile given their specified parameters (as will be described in greater detail presently). This occurs at 95.01.01.17.38.02.00. The form of the calculation is included in FIGS. 9A and 9B and results in an implicit contract bid price of A$51,920, the same as Abbotts & Taylor's desired investment amount, which Abrahamsons' parameters calculate will yield them a desired base margin on the contract of A$4,580.

An ordering party and each potential counterparty could potentially contract with each other on the basis of multiple sets of contingent entitlement payout amounts. For simplicity of explanation, Example I assumes that only four feasible sets of contingent entitlement amounts are available to the system 20 as the basis of a potential contract between Abrahamsons and Abbots & Taylor. They are the following:

1. A capped, downward sloping (45-degree) potential entitlement payout, embodied by FIGS. 9A and 9B. Note that in this and subsequent charts the potential entitlement payout is recognised by the potential counterparty Abrahamsons as the (negative) mirror image of the (positive) entitlement payout that the ordering party Abbott & Taylor would receive.

2. A second capped, downward sloping (45-degree) potential entitlement payout embodied by FIGS. 10A and 10B.

3. A capped, perpendicular (90-degree) potential entitlement payout embodied by chart FIGS. 11A and 11B.

4. A second capped perpendicular (90-degree) potential entitlement payout embodied by FIGS. 12A and 12B.

In all four feasible sets, the minimum entitlement amount for Abbotts & Taylor (the ordering party) is A$37,440. This amount represents 72 percent of Abbott & Taylor's investment, the amount it specified as the minimum entitlement it was prepared to accept for the contract. This was specified by Abbotts & Taylor in terms of an investment loss limit of 28 percent (FIG. 8).

Figure 13B:
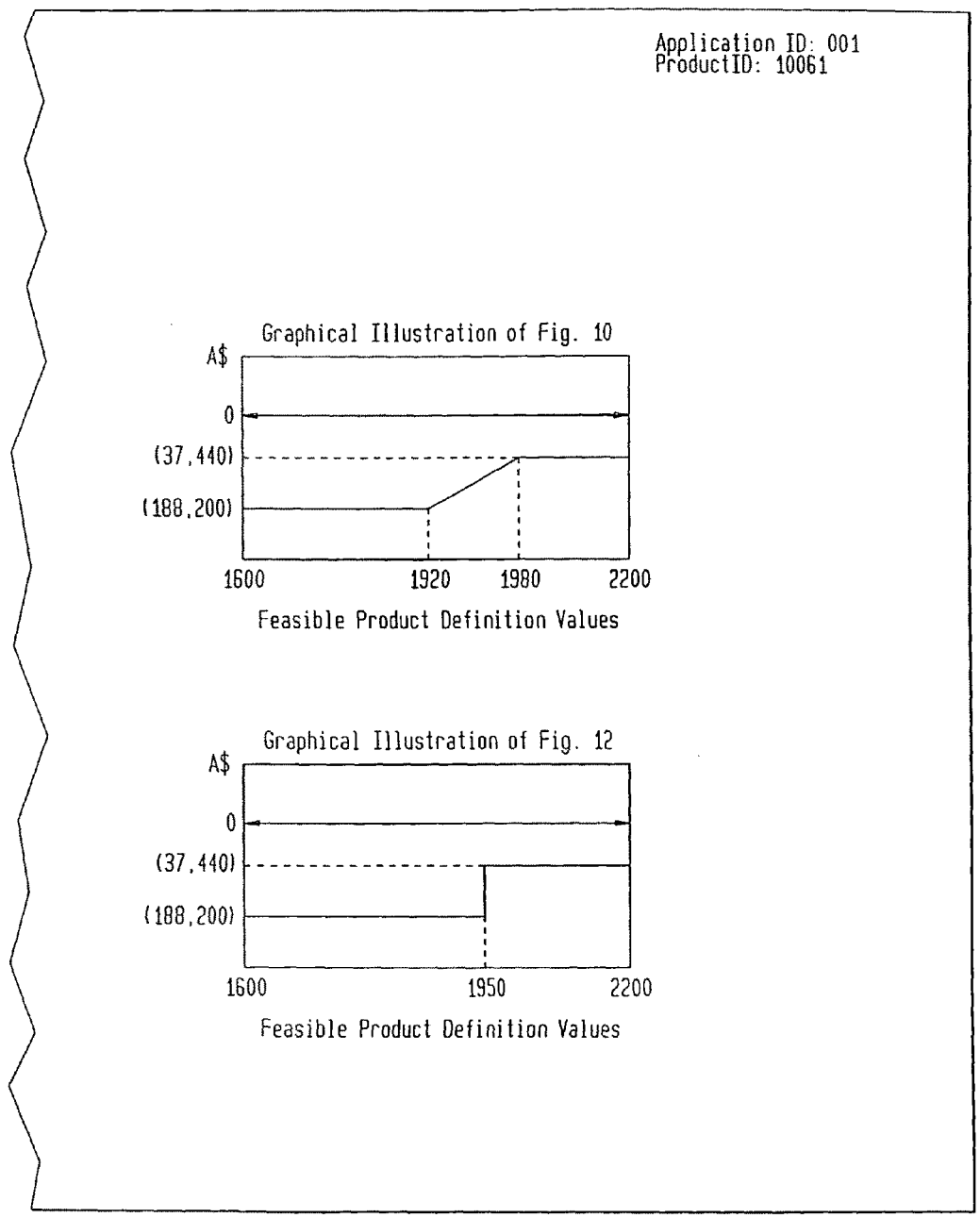

FIGS. 13A and 13B show in summary form all four feasible sets of contingent entitlement payouts to Abbotts & Taylor, from Abrahamsons' perspective. The system 20 produced these potential contracts between Abrahamsons and Abbotts & Taylor in the following manner. First, the system successively combines on a trial basis all possible combinations of entitlement attributes, namely "height" and "depth" of entitlement amounts and contingent payout range of feasible product definition values or "x-axis values", to reach a counterparty bid price for each combination. Simultaneously, all combinations that do not produce a bid price equivalent to the ordering party's specified investment amount (in this case A$51,920) are rejected. These results can be reached by various sophisticated heuristic and operations research-based methods as well as by the simple trial-and-error search process described here.

Still looking at the fifth step in the timeline, in conjunction with FIGS. 14A and 14B, it can be seen that Carpenters Inc's pricing parameters indicate that their appropriate defined circumstances ID for an ordering party such as Abbotts & Taylor is 17, which implies a commission rate of 1.30%, a discount rate of 9.80% pa, a particular set of component product prices (as shown) and a particular set of assessed probabilities of occurrence (as shown). As before, the system determines a feasible set of net contingent entitlement amounts both Carpenters Inc and Abbotts & Taylor would judge worthwhile given their specified parameters. This occurs at 95.01.01.17.38.02.00, (note that these contingent entitlement amounts differ from the amounts determined using Abrahamsons' parameters), and results in an implicit contract bid price of A$51,920, the same as Abbotts & Taylor's desired investment amount, which Carpenters Inc's parameters calculate will yield them a desired base margin on the contract of A$5,610.

Again, an ordering party and each potential counterparty could potentially contract with each other on the basis of multiple sets of contingent entitlement amounts. For simplicity of explanation, Example I assumes that only four feasible sets of contingent entitlement amounts are available as the basis of a potential contract between Carpenters Inc and Abbotts & Taylor. They are the following:

1. A capped, downward sloping (45-degree) potential entitlement payout, embodied by FIGS. 14A and 14B. Note that in this and subsequent charts the potential entitlement payout is recognised by the potential counterparty Carpenters Inc as the (negative) mirror image of the (positive) entitlement payout that the ordering party Abbott & Taylor would receive.

2. A second capped, downward sloping (45-degree) potential entitlement payout embodied by FIGS. 15A and 15B.

3. A capped, perpendicular (90-degree) potential entitlement payout embodied by FIGS. 16A and 16B.

4. A second capped, perpendicular (90-degree) potential entitlement payout embodied by FIGS. 17A and 17B.

In all four feasible sets, the minimum entitlement amount for Abbott & Taylor (the ordering party) is A$37,440. This amount represents 72 percent of Abbott & Taylor's investment, the amount it specified as the minimum entitlement it was prepared to accept for the contract. This was specified by Abbotts & Taylor in terms of an investment loss limit of 28 percent (FIG. 8).

Figure 18B:
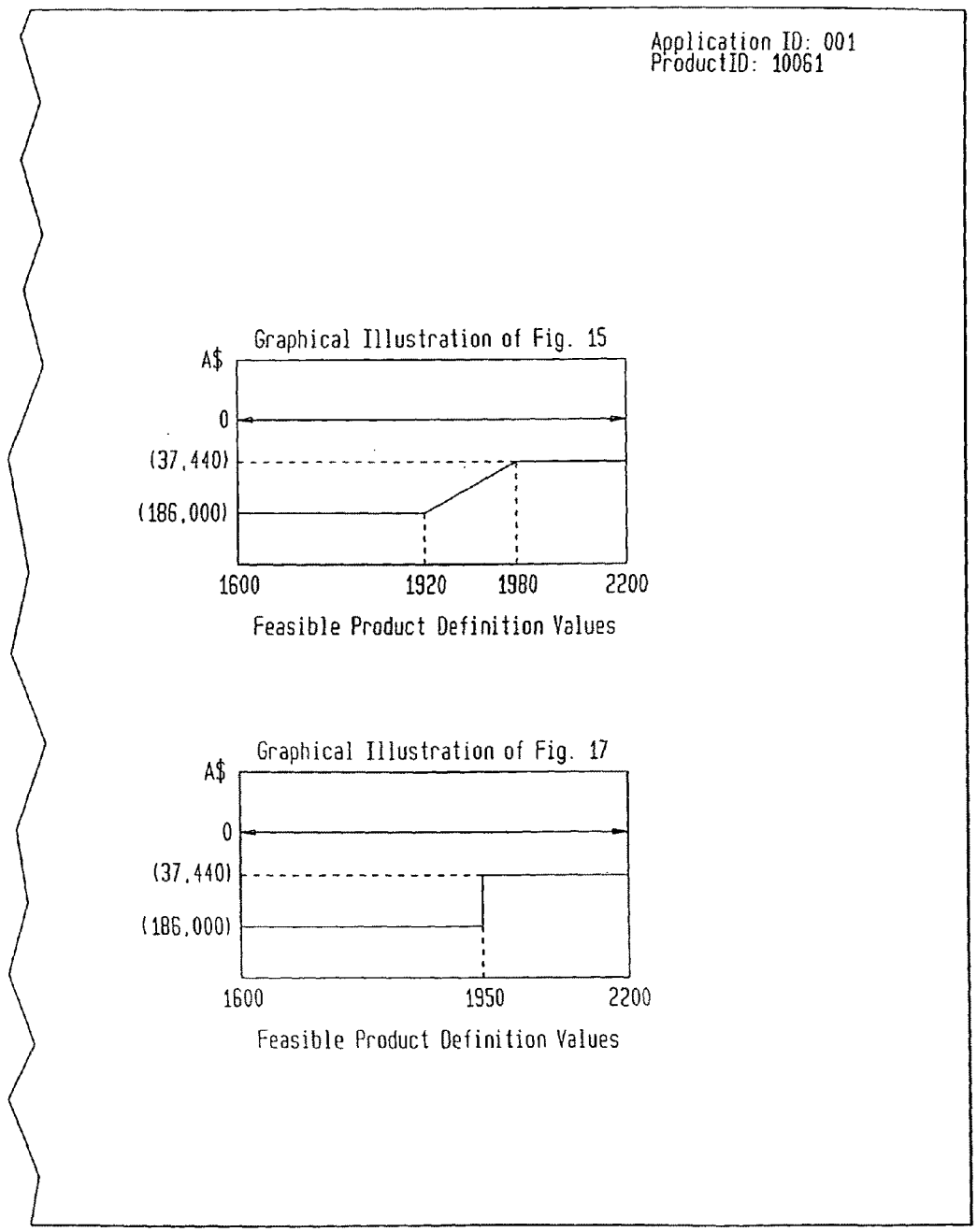

FIGS. 18A and 18B shows in summary form all four feasible sets of contingent entitlement payouts to Abbotts & Taylor, from Carpenters Inc's perspective. The system produced these potential contracts between Carpenters Inc and Abbotts & Taylor in the following manner. First, the system successively combines on a trial basis all possible combinations of entitlement attributes, namely "height" and "depth" of entitlement amounts and contingent payout range of feasible product definition values or "x-axis values", to reach a counterparty bid price for each combination. Simultaneously, all combinations that do not produce a bid price equivalent to the ordering party's specified investment amount (in this case A$51,920) are rejected.

Looking at the sixth step in the timeline, Order Matching, and at FIGS. 19A and 19B, it can be seen that the system 20 assesses the expected return of the eight contingent entitlement payout bids from Abrahamsons and Carpenters Inc. This is performed by applying each of the derived counterparty templates to Abbotts & Taylor's assessed probabilities of occurrence for each outcome. Each probability is multiplied by the elemental entitlement, and the products summed to give an implied entitlement, described as the "Expected Return Present Value" in FIGS. 19A and 19B. The implied entitlement then is subtracted from the investment amount to give the "net return". From Abbotts & Taylor's perspective, the bid of Abrahamsons termed Offer No. 4 (A$57,312) is a superior offering to all other bids, yielding Abbotts & Taylor a net return on investment of A$5,392. This leads to a formal matching of Abbotts & Taylor's order by Abrahamsons at 95.01.01.17.38.07.00, involving Abbotts & Taylor's original specified investment consideration amount of A$51,920.

Before the matching formally occurs, a check is made that absolute loss, expected loss, expected value and portfolio attribute limits are not violated.

The seventh step in the timeline, Order/Contract Confirmation (which is not illustrated in detail in the charts) can be seen to take place five seconds later at 95.01.01.17.38.11.00, after the system has determined that Abbotts & Taylor is able to (and then does) immediately pay its desired investment (consideration) amount of A$51,920 to Abrahamsons.

The remaining steps shown in the timeline of FIG. 3, including contract maturity and settlement, are not described, rather are incorporated herein by cross-reference to International Publication No. WO 94/28496 (PCT/AU93/00250).

Example II

This example of an investment contract is an extension of Example I. More particularly, however, it is a special case of the general case of Example I, in that, for any particular phenomenon, the system 20 is constrained to price a contract utilising one entitlement shape possibility only. Specifically, this shape is a straight line with respect to the "outcome" axis. Put another way, the gradient of the graph of entitlement (y-axis) against outcome (x-axis) is zero.

This case can be thought of as the situation where the ordering party has no direct interest in the value of the particular phenomenon at contract maturity date. Rather, the ordering party seeks an entitlement that is independent of this outcome. The investment contract, from the ordering party's view, is in the nature of a loan, in that a specified consideration will be made available to a contracting counterparty as the means of gaining a yet-to-be-determined future entitlement amount. This amount is not contingent on the outcome of the product phenomenon at contract maturity.

The example shows just this situation, in that one party (such as an institutional fund manager) seeks to gain from possession of a defined resource (say, Australian dollars) by becoming a party to a contract with another, as yet unknown, party (such as another fund manager) seeking to gain from making that defined resource available, the gain consisting of an entitlement payout in the future. In the example, the party seeking to gain from making the resource available is the ordering party to the investment contract, and the parties seeking to have possession of the defined resource are the counterparties to the contract.

The specific contract proposal is one which will provide an ordering party, upon payment of its nominated consideration to a matched counterparty, with a yet-to-be-determined entitlement (in Australian dollars) from the counterparty on contract maturity. The entitlement amount is a variable to be determined by the system 20 through pricing and matching an ordering party's input data with one or more counterparties' input data. That is, the system determines the "location" of the straight line shape with respect to the entitlement axis (y-axis) to enable matching of a contract that is worthwhile to both the ordering party and potential counterparty, subject to limits set by both parties.

The yet-to-be-determined entitlement is not contingent on the outcome of the particular phenomenon on which the contract is based. The amount will thus be essentially a function of a counterparty's "effective discount rate", determined by three parameters:

1. The discount (time of maturity to present day interest) rate specified by a counterparty for the contract;
2. The commission rate specified by a counterparty for the contract; and
3. The difference (positive or negative) between the sum of the counterparty's component product prices and unity.

Note that if, say, the sought-after contract entitlement denomination were US dollars, the matter of the counterparty's defined forward Australian dollar/US dollar exchange rate would also be relevant to the determination of the effective discount rate.

As noted, the relevant key stakeholders are the same as in Example I: an application promoter (BLC Inc); various product sponsors (the relevant one for the example being BLC Inc itself); various product ordering parties (the relevant one for the example being Abbotts & Taylor); various potential counterparties (the relevant ones for the example being Abrahamsons and Carpenters Inc); a counterparty guarantor (CNZ Banking Corporation); and an application regulator (Pacific Central Bank).

Figure 4:
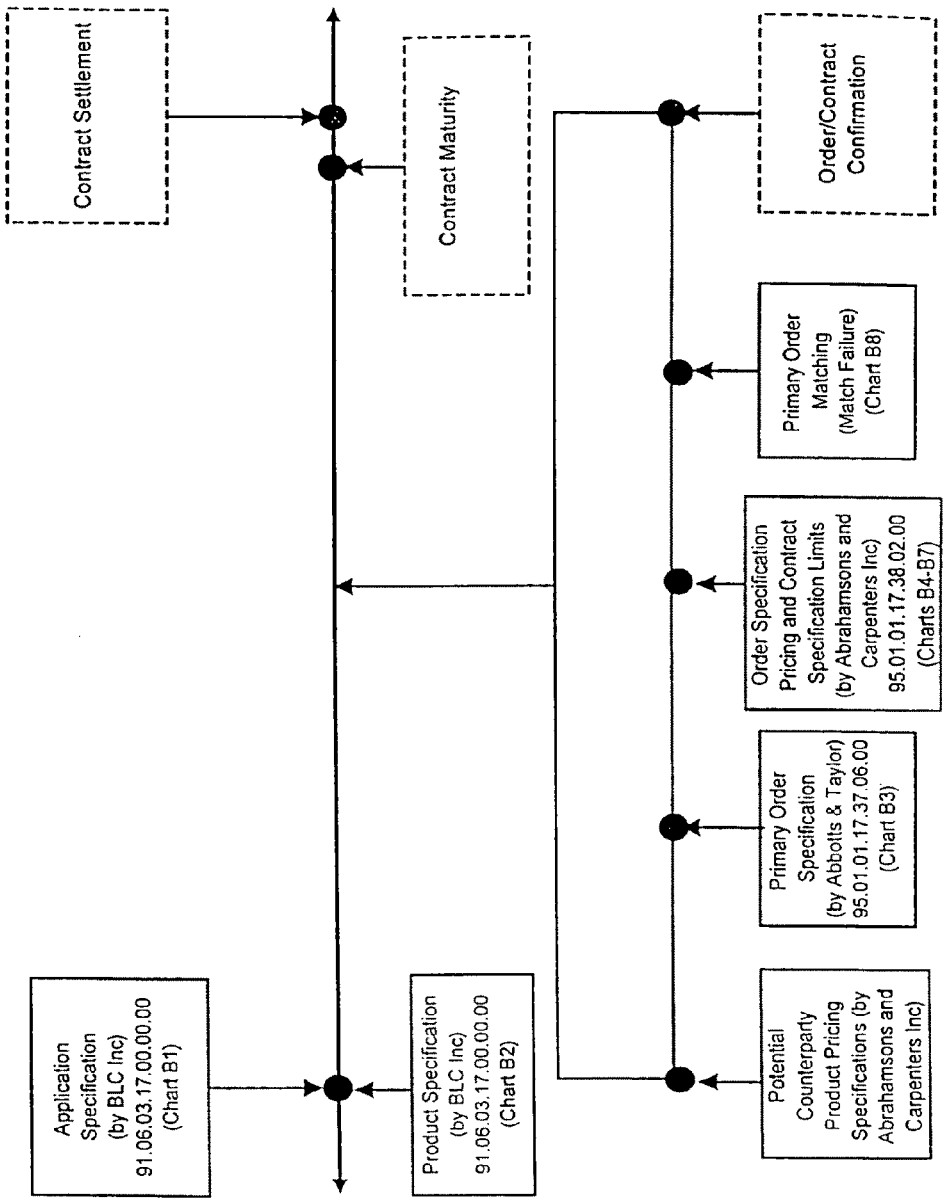
FIG. 4 is a timeline showing the steps of Example II.

A timeline depicting the steps in the contract from the first step, Application Specification, to the final step, Contract Settlement, is shown in FIG. 4 and further supported by FIGS. 20 to 27B.

Looking at the first step in the timeline, Application Specification, in conjunction with FIG. 20, we see that BLC Inc established a Contract APP (Application ID 001) on 91.06.03.17.00.00 (that is, at 5 pm on Jun. 3, 1991) to deal with investment. The application involves a pricing and matching objective function of: "maximise pre-tax expected return on consideration investment". As a system instruction this means: identify a counterparty (or counterparties) who have defined pricing parameters and contract, product and portfolio limits which, when combined with the ordering party's specified consideration, will yield an entitlement payout that is not contingent on the outcome of the product phenomenon and maximises the ordering party's pre-tax expected return on investment, subject to whatever match constraints the ordering party and/or counterparty have specified. Application ID 001 supports a range of products.

Looking at the second step in the timeline, Product Specification, in conjunction with FIG. 21, we see that BLC was also the product sponsor of Product 10061 at the same time (91.06.03.17.00.00). This product relates to the market for stock indices. The maturity date for Product 10061 is 96.06.03.17.00.00.00. The submarket is the PTSE 75 stock index. The consideration for a specific contract involving Product 10061 is in the form of money (commercial bank deposits denominated in Australian dollars). The entitlement payout is also in the form of commercial bank deposits denominated in Australian dollars, payable, if necessary, after the product's specified maturity date/time.

Looking at the third step in the timeline, Potential Counterparty Product Pricing Specifications, one finds two entities, Abrahamsons and Carpenters Inc, acting as potential counterparties for forthcoming primary product orders for Product 10061. At this point in the timeline (95.01.01.17.00.00.00), 43 months after the specification of Product 10061, both Abrahamsons and Carpenters Inc have current specified parameters for pricing potential forthcoming orders for the product.

Looking at the fourth step in the timeline, Primary Order Specification, in conjunction with FIG. 22, it can be seen that an ordering party, Abbotts & Taylor, is seeking a contract from an offering party in Product 10061 at that time (95.01.01.17.37.06.00). FIG. 22 shows the parameters that Abbotts & Taylor has specified for the contract it is seeking at this time, including a desired investment consideration of A$51,920. For this investment, Abbotts & Taylor has specified a minimum present value expected return of A$54,000, based on a discount rate of 11 percent per annum. In the specification, Abbotts & Taylor has constrained the system's determination of possible payout shapes to one general class of payout shape, namely, a straight line, where the gradient of the graph of entitlement (y-axis) against outcome (x axis) is zero.

Looking at the fifth step in the timeline, Order Specification Pricing, in conjunction with FIGS. 25A, 25B, and 26, it can be seen (FIGS. 25A and 25B) that the potential counterparty Abrahamsons provided registering data in the form of assessed probabilities of occurrence, a discount rate from the time of maturity to the present day, a flat commission rate and a maximum negative entitlement amount. Abrahamsons' pricing parameters indicate its appropriate defined circumstances ID for an ordering party such as Abbotts & Taylor is 26, which implies a commission rate of 1.25 percent, a discount rate of 10 percent per annum, a particular set of component product prices (as shown) and a particular set of assessed probabilities of occurrence (as shown). The system 20 determines, for Abrahamsons, a feasible set of equal net entitlement amounts that represent both Abrahamsons' best possible bid and a possibility for Abbotts & Taylor given their specified parameters. The calculated entitlement matching the consideration is $57,280. The form of the calculation is included in FIGS. 23A and 23B and results in an implicit contract bid price of A$51,920, the same as Abbotts & Taylor's desired investment amount, which Abrahamsons' parameters calculate will yield it a desired base margin on the contract of A$2,019. This determination occurs at 95.01.01.17.38.02.00.

Figure 24:
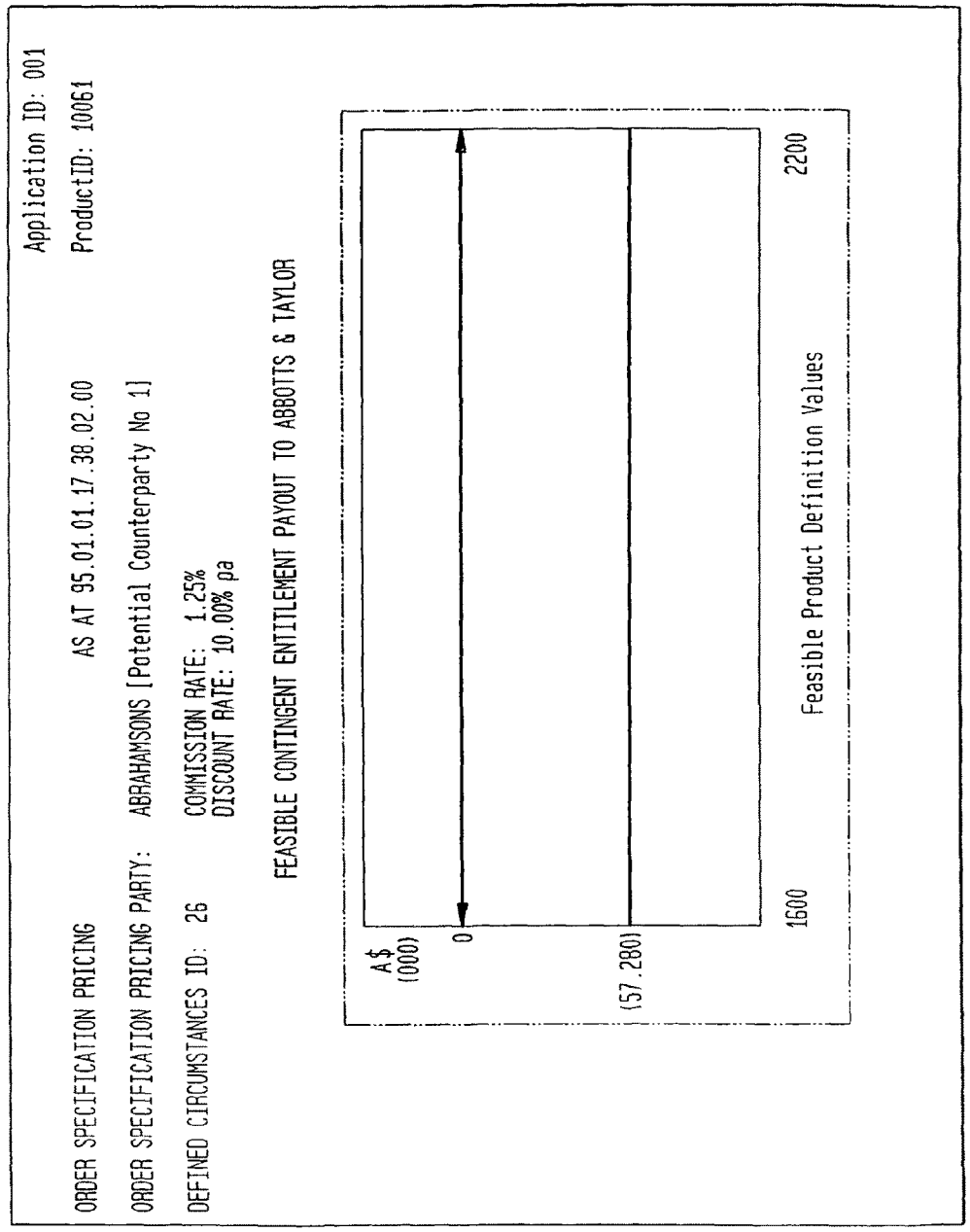
Figure 27B:
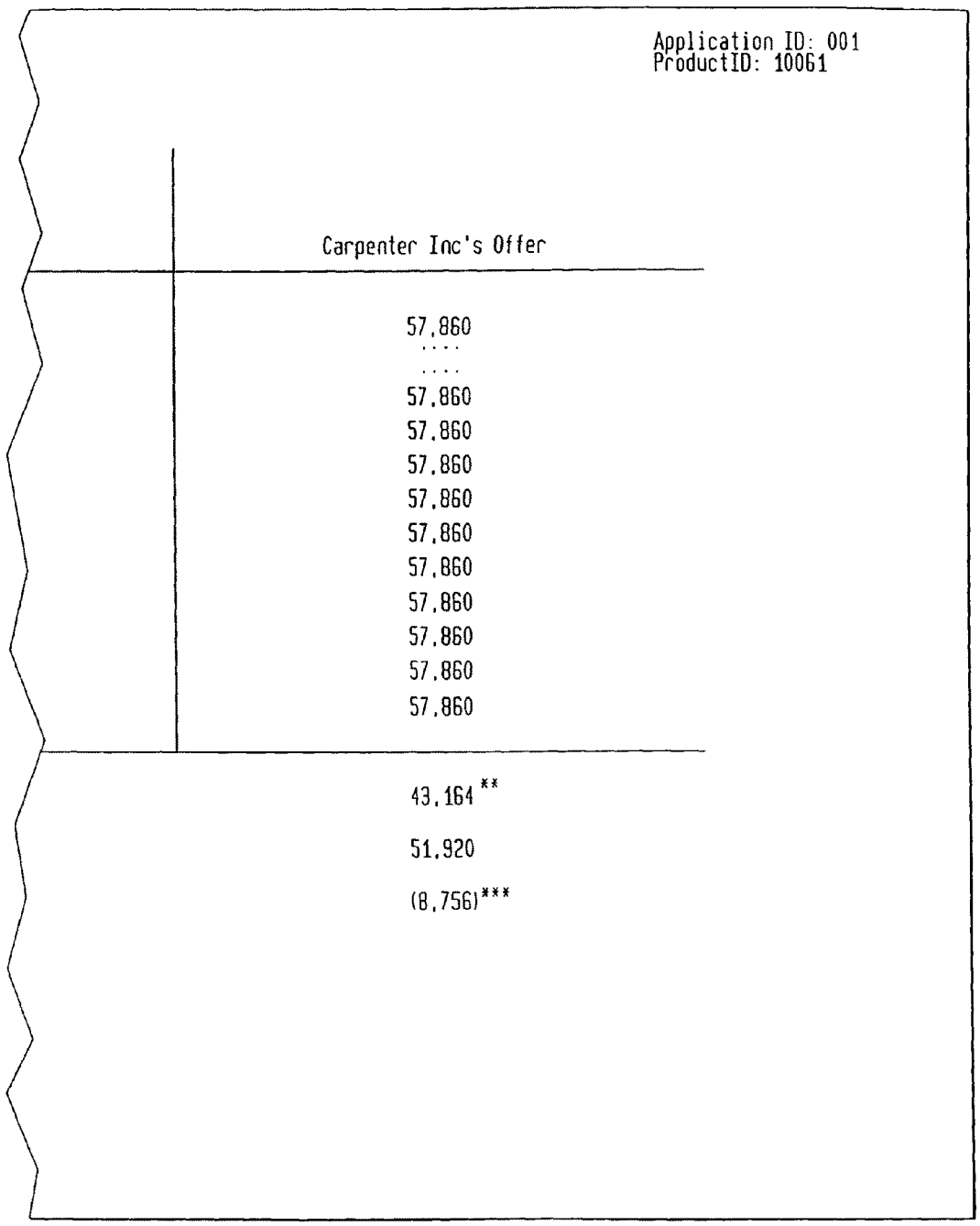

FIG. 24 shows the feasible set of equal contingent entitlement payouts to Abbotts & Taylor, from Abrahamsons' perspective, in graphical form. The system 20 generated this potential contract between Abrahamsons and Abbotts & Taylor in the following manner. First, the system successively trialed individually all possible entitlement amounts to reach a counterparty bid price equal to the ordering party's consideration (investment). Simultaneously, all amounts that did not produce a bid price equal to the ordering party's specified investment amount (in this case A$51,920) were rejected. As in Example I, these results could be reached by various sophisticated heuristic and operations research based methods as well as by the simple trial-and-error search process described here.

Still looking at the fifth step in the timeline, Order Specification Pricing, in conjunction with FIGS. 25A, 25B, and 26, it can be seen (FIGS. 25A and 25B) that the potential counterparty Carpenters Inc provided registering data in the form of assessed probabilities of occurrence, a discount rate from the time of maturity to the present day, a flat commission rate and a maximum negative entitlement amount. Carpenters Inc's pricing parameters indicate its appropriate defined circumstances ID for an ordering party such as Abbotts & Taylor is 17, which implies a commission rate of 1.30 percent, a discount rate of 9.8 percent per annum, a particular set of component product prices (as shown) and a particular set of assessed probabilities of occurrence (as shown). The system 20 determines, for Carpenters Inc, a feasible set of equal net entitlement amounts that represent both Carpenters Inc best possible bid and a possibility for Abbotts & Taylor given their specified parameters. The calculated entitlement matching the consideration is A$57,860 (note that this entitlement amount differs from the amount determined by the system 20 using Abrahamsons' parameters). The form of the calculation is included in FIGS. 25A and 25B and results in an implicit contract bid price of A$51,920, the same as Abbotts & Taylor's desired investment amount which Carpenters Inc's parameters calculate will yield it a desired base margin on the contract of A$1,550. This determination occurs at 95.01.01.17.38.02.00.

FIG. 26 shows the feasible set of equal contingent entitlement payouts to Abbotts & Taylor, from Carpenters Inc's perspective, in graphical form. The system 20 generated this potential contract between Carpenters Inc and Abbott & Taylor in the following manner. First, the system successively trialed individually all possible entitlement amounts to reach a counterparty bid price. Simultaneously, all amounts that did not produce a bid price equal to the ordering party's specified investment amount (in this case A$51,920) were rejected. These results could be reached by various sophisticated heuristic and operations research based methods as well as by the simple trial-and-error search process described here.

Looking at the sixth step in the timeline, Primary Order Matching (FIGS. 27A and 27B), it can be seen that the system 20 assessed the expected return to Abbotts & Taylor on the two entitlement payout bids from Abrahamsons and Carpenters Inc, respectively. Abrahamson's bid of A$57,280 yields an expected return to Abbotts & Taylor of A$42,730 and Carpenters Inc's bid of A$57,860 yields an expected return of A$43,164. Both amounts are below Abbotts & Taylor's specified minimum expected return of A$54,000. In addition, both bids would result in a negative net return on investment to Abbotts & Taylor of (A$9,190) and (A$8,756) respectively. Therefore the order matching fails.

Since the transaction does not proceed, the steps of Contract Confirmation, Contract Maturity and Contract Settlement, as shown in the timeline, do not occur in relation to Abbotts & Taylor's order specification.

Example III

This further example of an investment contract is a variation of Example II and describes the formulation of a contract where an ordering party seeks to gain an entitlement in a denominated resource (in this case commercial bank US dollars) from another, as yet unknown, party in exchange for a consideration in a differently denominated resource (in this case commercial bank Australian dollars).

The example is a special case of the general case of Example II in that the ordering party has no direct interest, at contract maturity date, in the value of the product phenomenon on which the contract is based. Rather, the ordering party seeks an entitlement that is independent of this outcome.

Unlike Example II, however, the investment contract is in the nature of an exchange, in that a specified consideration in one denomination will be made available to a contracting counterparty as the means on gaining a yet-to-be determined future entitlement amount in a different denomination. This amount is not contingent on the outcome of the product phenomenon at the time that the contract matures.

The example also involves a unique notion of contract maturity. In the case of Examples I and II, all contracts in the specified product phenomenon mature at the same time. In this example, however, each contract in the product phenomenon matures at the precise moment in time that the contract is matched, that is, at the earliest point in time that the ordering party's contract specification is matched by the system 20 with a counterparty bid. Put another way, contract maturity is simultaneous with order matching, not with a specified future date for all contracts related to the product phenomenon in question. Therefore the product phenomenon could be said to have a continuum of maturity dates made up of all the points in time that contracts are matched. In this way the product could be described as maturing each time a contract is matched.

In the example, the investment contract offering is one where an ordering party specifies to the system 20 that it is prepared to exchange a consideration of A$102,900 for a yet-to-be-determined entitlement in US dollars of not less than US$70,000.

The relevant key stakeholders are the same as in Example II: an application promoter (BLC Inc); various product sponsors (the relevant one for the example being BLC Inc itself); various product ordering parties (the relevant one for the example being Abbotts & Taylor), various potential counterparties (the relevant ones for the example being Abrahamsons and Carpenters Inc); a counterparty guarantor (CNZ Banking Corporation); and an application regulator (Pacific Central Bank).

Figure 5:
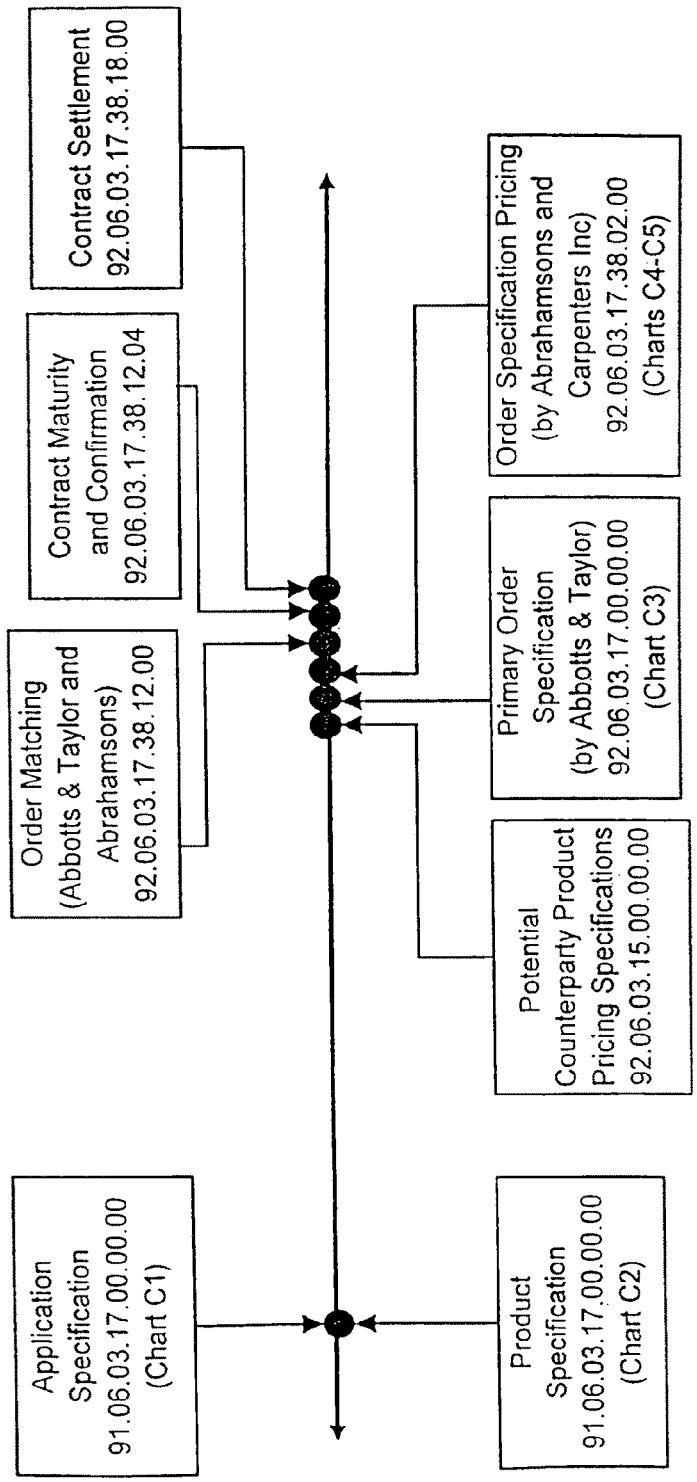
FIG. 5 is a timeline showing the steps of Example III.

A timeline depicting the steps in the contract from the first step, Application Specification, to the final step, Contract Settlement, is shown in FIG. 5 and further supported by FIGS. 28-32B.

Looking at the first step in the timeline, Application Specification, in conjunction with FIG. 28, we see that BLC Inc established a Contract APP (Application ID 201) on 91.06.03.17.00.00 (that is, at 5 pm on Jun. 3, 1991) to deal with investment. The application involves a pricing and matching objective function of: "maximise pre-tax expected return on consideration/entitlement investment". Application ID 201 supports a range of products.

Looking at the second step in the timeline, Product Specification, in conjunction with FIG. 29, we see that BLC Inc. was also the product sponsor of Product 11099 at the same time (91.06.03.17.00.00). This product relates to the market of immediate exchange. The maturity date for contracts in Product 11099 is "simultaneous with contract matching". The consideration for a specific contract involving Product 11099 is in the form of money (commercial bank deposits denominated in Australian dollars). The entitlement payout is in the form of commercial bank deposits denominated in US dollars, payable immediately at contract matching; that is, the product matures on contract matching.

Looking at the third step in the timeline, Potential Counterparty Product Pricing Specifications, two entities, Abrahamsons and Carpenters Inc, are potential counterparties for forthcoming primary product orders dealing with Product 11099. At this point in the timeline (92.06.03.15.00.00.00), 12 months after the specification of Product 11099, both Abrahamsons and Carpenters Inc have current specified parameters for pricing potential forthcoming orders for the product.

Looking at the fourth step in the timeline, Primary Order Specification, in conjunction with FIG. 30, it can be seen that an ordering party, Abbotts & Taylor, is seeking a contract from an offering party in Product 11099 at that time (92.06.03.17.00.00.00). FIG. 30 shows the parameters that Abbotts & Taylor has specified for the contract it is seeking at this time, namely a desired investment consideration of A$102,900 to be exchanged as soon as possible for an entitlement amount of no less than US$70,000.

As can be seen in FIGS. 31A and 31B, because contract maturity is simultaneous with contract matching, there are no feasible product definition values (that is, possible contingent outcomes for the PTSE 75 phenomenon). Abrahamsons therefore submits only an entitlement/consideration exchange rate and a per annum commission rate. The component product values are, by definition, unity.

Looking at the fifth step in the timeline, Order Specification Pricing, in conjunction with FIGS. 31A and 31B, it can be seen that the system 20 determines that the entitlement amount that the potential counterparty Abrahamsons judges to be ideal given its specified parameters is US$84,000. This determination occurs at 92.06.03.17.38.02.00. Abrahamsons' pricing parameters specify an exchange rate of 1.210, a commission rate of 1.25 percent and a single assessed probability of one (1) (discount (interest) rate and component product prices being irrelevant in this case). Abrahamsons' entitlement bid of US$84,000 is therefore above Abbotts & Taylor's specified minimum entitlement amount of US$70,000.

Still looking at the fifth step in the timeline, Order Specification Pricing, in conjunction with FIGS. 32A and 32B, it can be seen that the system 20 determines that the entitlement amount that the potential counterparty Carpenters Inc judges to be ideal given its specified parameters is US$82,000. This determination occurs at 92.06.03.17.38.02.00. Carpenters Inc's pricing parameters specify an exchange rate of 1.239, a commission rate of 1.30 percent and a single assessed probability of one (1) (discount (interest) rate and component product prices again being irrelevant in this case). Abrahamsons' entitlement bid of US$82,000 is therefore also above Abbotts & Taylor's specified minimum entitlement amount of US$70,000.

Looking at the sixth step in the timeline, Primary Order Matching, it can be seen that the system 20 assessed Abrahamsons' bid to be superior to that of Carpenters Inc and above Abbotts & Taylor's specified minimum entitlement amount. This led to a formal matching and confirmation of Abbotts & Taylor's order by Abrahamsons at 92.06.03.17.38.12.00. Contract order matching and confirmation is contemporaneous with contract maturity, which can be seen in the seventh step in the timeline to occur four seconds later at 92.06.03.17.38.12.04, at which time the exchange of Abbotts & Taylor's consideration of A$102,900 for Abrahamsons' entitlement of US$84,000 takes place.

The seventh and final step in the timeline, Contract Settlement, is completed six seconds later at 92.06.03.38.18.00.00.
Delay of Formal Order Matching A further embodiment, relevant to each of the embodiments of Examples I to III above, involves the order pricing and matching procedures as before. There then follows an additional step, before formal matching and confirmation occurs, of introducing a period of time during which the ordering party and counterparty can seek further contracts in the same or other applications and products. This step enables ordering parties and counterparties to take steps to manage the financial consequences of the new contract on their portfolio. The period of obligation can be specified by the promoter stakeholder, and thus be known to the ordering party and the registering counterparties.
Pricing Only As a further embodiment, it is possible for any ordering party to make a 'pricing only' enquiry of the system 20 in relation to potential, but unmatched, investment contracts. The system treats the enquiry as a normal contact request, however after deriving the one or more implied entitlements from the set of templates arrived at, does not perform the final steps of comparing the implied entitlements against the investment amount (consideration). In this way potential counterparties can gain market knowledge without committing themselves to a contractual obligation.
Pricing after Match A further extension of the pricing enquiry is to permit matched contracts to be repriced during the period between match and maturity. This is performed by the party who acted as the ordering party to the contract in question to gain market knowledge of performance of the investment against a different (current) pool of counterparties. That is, the pricing is performed on the basis of the original investment amount but against the contemporaneous counterparty data, which is almost certain to be different from that at the time the contract was originally priced and matched. Indeed, even only a subset of the contemporaneous counterparty data may be specified or utilised in the repricing.

Such repricing can be a valuable tool to the original investing ordering party, as it may prompt other investments, or the submission of registering data whereby the party concerned acts rather as a counterparty.

Multiple Component Counterparties

In the Examples given above, the ordering party's investment amount is priced for its whole amount against each counterparty's registering data. It is equally possible for the consideration to be divided into integer components, and each integer component treated as a separate pricing and matching task. The matched contract then is constructed as the summed combination of all the matched components.

What is claimed is:

1. A data processing system to enable the formulation of multi-party investment contracts, the system comprising:
   input means for allowing an ordering party to input contract data relating to a least one phenomenon, each said phenomenon having a range of future outcomes and a future time of maturity, the contract data including a set of probabilities of occurrence for each outcome in said range and a consideration due to a counterparty at or after the time of matching, and further by which at least one counterparty can input registering data including a set of probabilities of occurrence for each outcome in said range; and
   a processor configured to price and match a contract for a said phenomenon from said contract data and said registering data, wherein said processor configured to price said contract by:
   applying at least one template of entitlement as a function of outcome to each counterparty's set of probabilities to give one or more individual counterparty prices each equal to the ordering party's consideration; and
   applying the ordering party set of probabilities to each said template to derive an implied entitlement;
   wherein said processor is configured to match said contract by:
   determining which counterparty will provide the best entitlement on maturity by comparing each implied entitlement with the consideration; and
   wherein said processor is configured to match the contract with that counterparty having the template for the best said comparison.

2. A data processing system to enable the formulation of a multi-party investment contract, the system comprising:
   a data storage unit having stored therein information about a phenomenon having a set of future outcomes and a future time of maturity; and
   a computer, coupled to said data storage unit, that is configured to
      (a) receive contract data from a first party including a set of probabilities of occurrence for each outcome in said range and a consideration due to a second party at or after the time of matching; and
      (b) receive registering data from at least one second party including a set of probabilities of occurrence for each outcome in said range;
      (c) for each second party, price a contract by applying at least one template of entitlement as a function of outcome to the second party's set of probabilities to give one or more individual second party prices each equal to said consideration, and applying said first party set of probabilities to each said template of entitlement to derive one or more implied entitlement valuations;
      (d) match a contract for said phenomenon from said contract data and registering data, including:
         i. determining which second party will provide the best entitlement on maturity by comparing each implied entitlement valuation with said consideration, and
         ii. matching a contract with that second party having a template of entitlement for the best said comparison;
      (e) store said contract in said data storage unit.

3. A data processing system to enable the formulation of a multi-party investment contract, the system comprising:
   a data storage unit having stored therein
      (a) information about a phenomenon having a set of future outcomes and a future time of maturity; and
      (b) a set of entitlement shapes;
   a computer, coupled to said data storage unit, that is configured to
      (a) receive contract data from a first party including a set of probabilities of occurrence for each outcome in said range, a selected entitlement shape from the set of entitlement shapes and a consideration due to a second party at or after the time of matching; and
      (b) receive registering data from at least one second party including a set of probabilities of occurrence for each outcome in said range;
      (c) for each second party, price a contract by applying at least one template of entitlement derived from said selected entitlement shape as a function of outcome to the second party's set of probabilities to give one or more individual second party prices each equal to said consideration, and applying said first party set of probabilities to each said template of entitlement to derive one or more implied entitlement valuations;
      (d) match a contract for said phenomenon from said contract data and registering data, including:
         i. determining which second party will provide the best entitlement on maturity by comparing each implied entitlement valuation with said consideration, and
         ii. matching a contract with that second party having a template of entitlement for the best said comparison;
      (e) store said contract in said data storage unit.

4. A data processing system as in claim 3, wherein said selected entitlement shape is a capped downward sloping (45-degree) shape.

5. A data processing system as in claim 3, wherein said selected entitlement shape is a capped downward perpendicular (90-degree) shape.

6. A data processing system as in claim 3, wherein said selected entitlement shape is a capped upward sloping (45-degree) shape.

7. A data processing system as in claim 3, wherein said selected entitlement shape is a capped upward perpendicular (90-degree) shape.

8. A data processing system to enable the formulation of a multi-party investment contract, the system comprising:
   a data storage unit having stored therein information about a phenomenon having a set of future outcomes and a future time of maturity; and
   a computer, coupled to said data storage unit, that is configured to (a) receive contract data from a first party including a set of probabilities of occurrence for each outcome in said range, a specified entitlement shape and a consideration due to a second party at or after the time of matching; and
(b) receive registering data from at least one second party including a set of probabilities of occurrence for each outcome in said range;
(c) for each second party, price a contract by applying at least one template of entitlement derived from said specified entitlement shape as a function of outcome to the second party's set of probabilities to give one or more individual second party prices each equal to said consideration, and applying said first party set of probabilities to each said template of entitlement to derive one or more implied entitlement valuations;
(d) match a contract for said phenomenon from said contract data and registering data, including:
  i. determining which second party will provide the best entitlement on maturity by comparing each implied entitlement valuation with said consideration, and
  ii. matching a contract with that second party having a template of entitlement for the best said comparison;
(e) store said contract in said data storage unit.

* * * * *

UNITED STATES PATENT AND TRADEMARK OFFICE
CERTIFICATE OF CORRECTION

PATENT NO.        : 8,229,817 B2
APPLICATION NO.   : 12/607786
DATED             : July 24, 2012
INVENTOR(S)       : Shepherd Page 1 of 1

It is certified that error appears in the above-identified patent and that said Letters Patent is hereby corrected as shown below:

On the Title Page
Item [57], ABSTRACT, lines 1-2, please replace "investments contracts" with
--investment contracts--.

In the Claims
Column 15, Claim 1
Line 23, please replace "a least one phenomenon" with --at least one phenomenon--.

Signed and Sealed this
Seventh Day of January, 2014

Margaret A. Focarino
*Commissioner for Patents of the United States Patent and Trademark Office*